United States Patent
Forutanpour

(10) Patent No.: US 8,184,196 B2
(45) Date of Patent: May 22, 2012

(54) SYSTEM AND METHOD TO GENERATE DEPTH DATA USING EDGE DETECTION

(75) Inventor: Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 12/185,887

(22) Filed: Aug. 5, 2008

(65) Prior Publication Data

US 2010/0033617 A1    Feb. 11, 2010

(51) Int. Cl.
    H04N 5/232    (2006.01)
    H04N 9/74    (2006.01)
    H04N 5/21    (2006.01)
    G06K 9/40    (2006.01)
    G06K 9/48    (2006.01)

(52) U.S. Cl. ........ 348/345; 348/252; 348/239; 348/597; 348/625; 382/266; 382/199; 382/255

(58) Field of Classification Search .......... 348/252, 348/345, 346, 745, 597, 625, 586, 606, 239; 382/263, 266, 269, 199, 255, 106
    See application file for complete search history.

(56) References Cited

U.S. PATENT DOCUMENTS

| | | | | |
|---|---|---|---|---|
| 5,282,045 A * | 1/1994 | Mimura et al. | | 348/352 |
| 5,793,900 A * | 8/1998 | Nourbakhsh et al. | | 382/263 |
| 6,055,330 A * | 4/2000 | Eleftheriadis et al. | | 382/154 |
| 7,058,233 B2 * | 6/2006 | Silber | | 382/256 |
| 7,262,798 B2 * | 8/2007 | Stavely et al. | | 348/255 |
| 7,356,195 B2 * | 4/2008 | Shaked et al. | | 382/260 |
| 2005/0035977 A1 * | 2/2005 | Yokoyama et al. | | 345/611 |

(Continued)

FOREIGN PATENT DOCUMENTS

DE    102004006246    10/2005

OTHER PUBLICATIONS

Nayar S K et al: "Shape From Focus: An Effective Approach for Rough Surfaces" Proceedings of the International Conference on Robotics and Automation. Cincinnati, May 13-18, 1990; [Proceedings of the International Conference on Robotics and Automation], Los Alamitos, IEEE Comp. Soc. Press, US, vol. May 13 1990, pp. 218-225, XP000139932 ISBN: 978-0/8186-9061-7.

(Continued)

Primary Examiner — Nhan T Tran
Assistant Examiner — Marly Camargo
(74) Attorney, Agent, or Firm — Matthew J. Evans; James R. Gambale, Jr.

(57) ABSTRACT

Systems and methods of generating depth data using edge detection are disclosed. In a particular embodiment, first image data is received corresponding to a scene recorded by an image capture device at a first focus position at a first distance. Second image data is received corresponding to a second focus position at a second distance that is greater than the first distance. Edge detection generates first edge data corresponding to at least a first portion of the first image data and generates second edge data corresponding to at least a second portion of the second image data. The edge detection detects presence or absence of an edge at each location of the first portion and the second portion to identify each detected edge as a hard or soft edge. Depth data is generated based on the edge data generated for the first and second focus positions.

25 Claims, 16 Drawing Sheets

U.S. PATENT DOCUMENTS

2006/0062484 A1* 3/2006 Aas et al. .................. 382/255

OTHER PUBLICATIONS

Gokstorp M: "Computing depth from out-of-focus blur using a local frequency representation" Pattern Recognition, 1994. vol. 1, Conference A: Computer Vision & Image Processing, Proceedings of the 12th IAPR International Conference on Jerusalem, Israel Oct. 9-13, 1994, Los Alamitos, CA, USA,IEEE Comput. Soc, vol . 1, Oct. 9, 1994 , pp. 153-158, XP010215959 ISBN: 978-0/8186-6265-2 * abstract, Figure 5, sections 1-2, equation (7) *.

International Search Report and Written Opinion—PCT/US2009/052757—ISA/EPO—Jan. 13, 2010.

Mitsunobu K et al: "MPEG video encoding using depth from focus" Signal Processing, 2002 6th International Conference on Aug. 26-30, 2002, Piscataway, NJ, USA, IEEE, vol. 1, Aug. 26, 2002, pp. 825-828, XP010628115 ISBN: 978-0/7803-7488-1 the whole document.

Shaked D et al: "Sharpness Measure: Towards Automatic Image Enhancement" Image Processing, 2005. I C I P 2005. IEEE International Conference on Genova, Italy—Sep. 11-14, 2005, Piscataway, NJ, USA, IEEE, vol. 1, Sep. 11, 2005, pp. 937-940, XP010850974 ISBN: 978-0/7803-9134-5 * abstract, eqs. (2)-(6).

Waldowski M IEEE, "A New Segmentation Algorithm for Videophone Applications Based on Stereo Image Pairs", Transactions on Communications, 19911201 IEEE Service Center, Piscataway, NJ, US—ISSN 0090-6778 vol. 39, Nr:12, pp. 1856-1868.

* cited by examiner

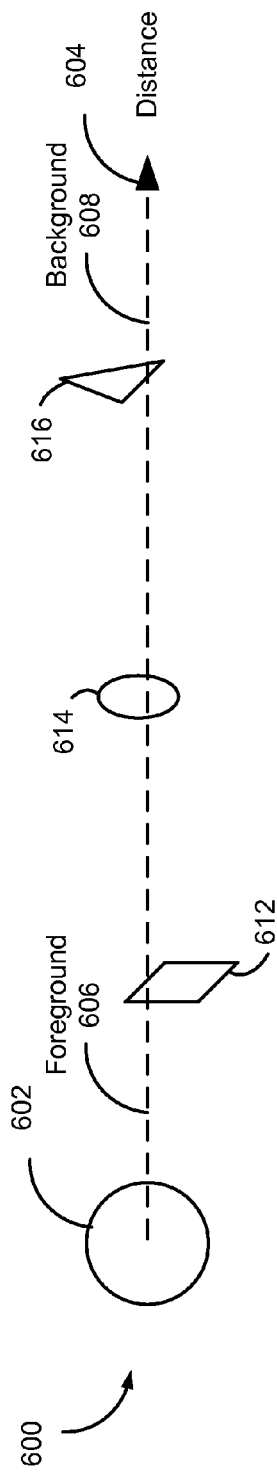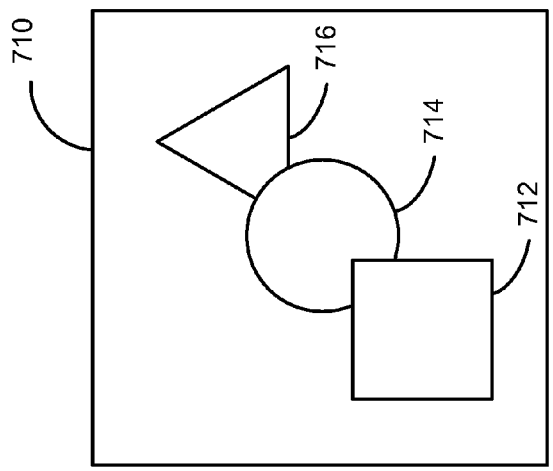
*FIG. 6*
*FIG. 7*

SYSTEM AND METHOD TO GENERATE DEPTH DATA USING EDGE DETECTION

FIELD

The present disclosure is generally related to edge detection and depth data generation based on a captured image.

DESCRIPTION OF RELATED ART

Digital imaging technology allows for compact devices to capture image data, as well as enhance and transmit image data. For example, many personal digital assistants (PDAs) and wireless telephone devices include built-in imaging systems that allow for the capture of still images or motion video that can be transmitted to other devices via wired or wireless connections.

Taking advantage of digital imaging technology, it may be desirable to differentiate between objects at varying distances to the image capture device and thus control what aspects of a scene are captured, stored, or transmitted. For example, in the case of video telephony, for clarity, privacy, or other reasons, it may be desirable to show the caller in the foreground, while not capturing other persons or settings in the background. Further taking advantage of such technology, a digital imaging device mounted on a vehicle or carried by a vision-impaired person could provide proximity warnings when objects are within a certain threshold distance.

However, many conventional systems that determine distance typically use stereoscopic vision, involving two or more image sensors. Because of size and power consumption considerations, it may not be desirable to include multiple image sensors in portable electronic devices such as PDAs or wireless telephones.

SUMMARY

In a particular embodiment, a method is disclosed where first image data is received corresponding to a scene recorded by an image capture device at a first focus position at a first distance. Second image data is received corresponding to a second focus position at a second distance that is greater than the first distance. Edge detection generates first edge data corresponding to at least a first portion of the first image data and to generate second edge data for at least a second portion of the second image data. The edge detection detects presence or absence of an edge at each location of the first portion and the second portion and identifies each detected edge as a hard or soft edge. Depth data is generated based on the edge data generated for the first and second focus positions.

In another particular embodiment, a system is disclosed where the system includes an input to receive a control signal to capture image data. An image capture device generates a plurality of image data sets captured at a plurality of focus positions in response to the control signal. An output provides at least one image data set and provides depth data for at least one point in the at least one image data set. The depth data is based on a focus position in which the at least one point is determined to have a detectable edge.

In another particular embodiment, a system is disclosed that includes an input adapted to receive video image data from an image capture device. The video image data includes first image data associated with a first focus position and second image data associated with a second focus position. A processor receives the first image data and the second image data. The processor is configured to determine a background portion of the video image data by applying a single pass of an edge detection filter to generate depth data to identify a foreground portion and the background portion of the first image data using the depth data. An output is adapted to provide video data selectively presenting image data for the foreground portion differently from the image data for the background portion.

One particular advantage provided by at least one of the disclosed embodiments is an ability to determine, using a single image capture device, a depth of objects relative to the image capture device so that the image data can be selectively presented based on the depth of objects in the scene recorded by the image capture device.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 6 is a perspective view of a scene including a plurality of objects at varying focus distances from an image capture device;

FIG. 7 is a two-dimensional view of an image data set of the objects in the scene of FIG. 6 in which each of the images is in focus;

DETAILED DESCRIPTION

Figure 1:
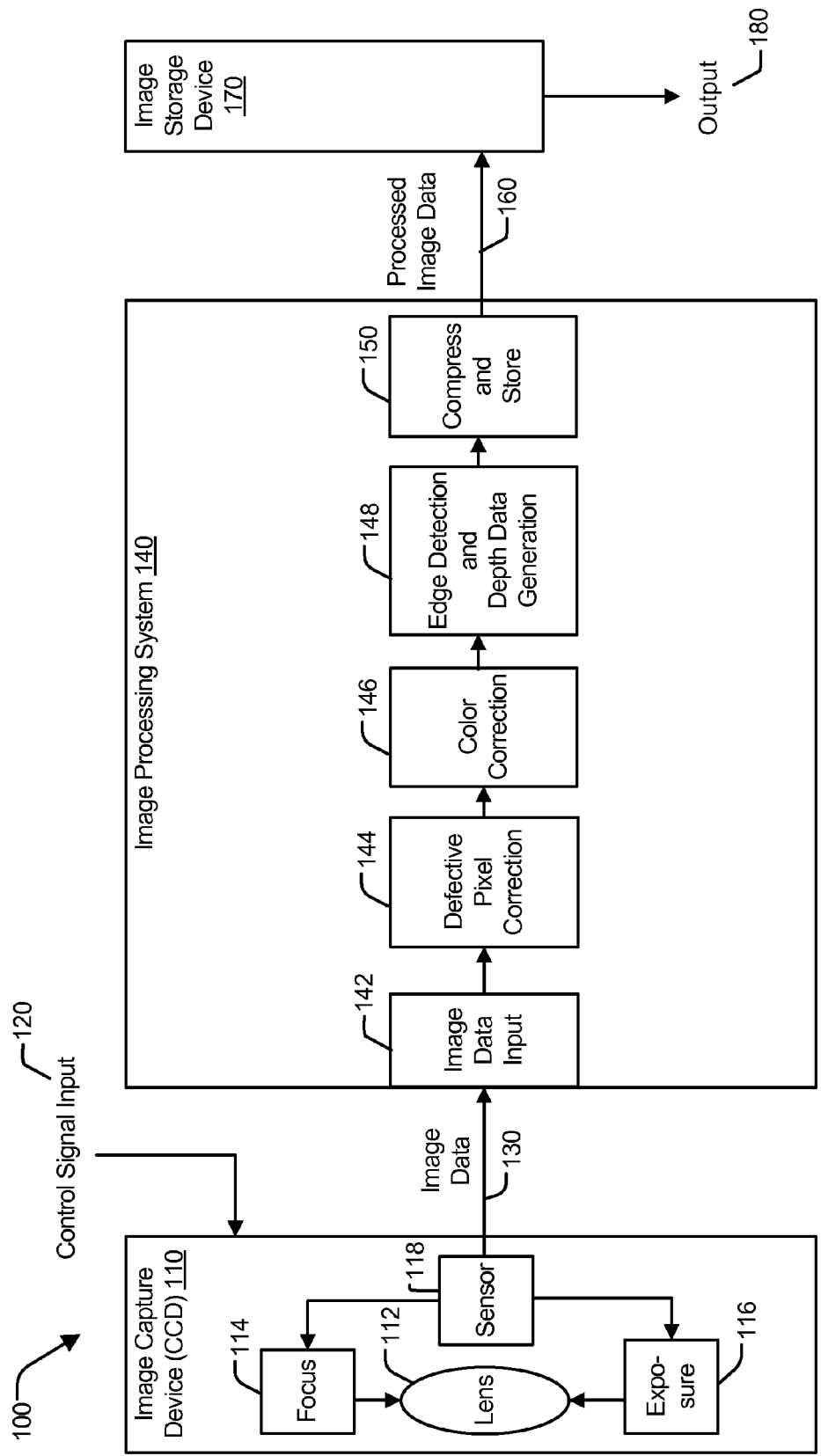
FIG. 1 is a block diagram of a particular illustrative embodiment of a system including an image processing system having an edge detection and depth map generation module.

FIG. 1 is a block diagram of a particular illustrative embodiment of a system generally designated 100 that includes an image capture device 110, an image processing system 140, and an image storage device 170. A single image capture device 110 receives a control input signal 120 that directs the image capture device 110 to collect image data 130. The image capture device 110 is coupled to an image processing system 140 that receives and processes the image data 130. The image processing system 140 generates processed image data 160. The image processing system 140 is coupled to the image storage device 170 that receives and stores the processed image data 160. The processed image data 160 includes at least one image and depth data extracted from the image data 130. The processed image data 160, the depth data generated from the processed image data 160, or any combination thereof is presented at an output 180. Generally, the system 100 may be implemented in a portable electronic device that is configured to perform real-time image processing using relatively limited processing resources.

In a particular embodiment, the image capture device 110 is a camera, such as a video camera or a still camera. The image capture device 110 includes a lens 112 that is responsive to a focusing module 114 and to an exposure module 116. The focusing module 114 manipulates the lens 112 to focus at specified distances from the lens that are known to the focusing module 114 based on the lens 112/focusing module 114 configuration. The focusing module 114 also is suitably configured to automatically focus the lens 112 on an assumed subject of a scene, such as an object occupying a central portion of a field of view. The focusing module 114 is configured to focus the lens 112 from its nearest focus, which is termed a macro focus position of the scene, to its furthest focus, which is termed an infinity focus position. As described further below, when generating a depth map the focusing module 114 may be configured to manipulate the lens 112 to capture image data of the scene at a plurality of different focus distances.

The image capture device also includes a sensor 118, such as a charge coupled device (CCD) array or another image sensing device, coupled to receive light via the lens 112 and to generate the image data 130 in response to an image received via the lens 112. An exposure module 116 coupled to the sensor 118 may be responsive to the sensor 118 and/or the lens 112 to control an exposure of the image.

The control signal input 120 may be generated by a user activating a switch or by the image processing system 140. The control signal input 120 directs the image capture device 110 to capture image data and may direct the image capture device 110 to capture multiple images of a scene at a plurality of focus distances, such that the image data 130 generated by the image capture device 110 includes a plurality of image data sets for each of the plurality of focus distances. The focus distances may include a macro focus position, an infinity focus position, one or more other focus positions between the macro focus position and an infinity focus position, or any combination thereof.

The image data 130 generated by the image capture device 110 is received by the image processing system 140 at an image data input 142. The image processing system 130 may include a defective pixel correction module 144 configured to make adjustments to the image data 130 to correct pixels or groups of pixels identified as defective. The image processing system 140 also may include a color correction module 146 that is configured to adjust color values determined to be undesirable. The defective pixel correction module 144 and the color correction module 146 may be selectively engaged in processing the image data 130. Thus, in embodiments of the present disclosure, the correction modules 144 and 146 may be applied to all image data 130 or may be skipped in processing image data sets used in generating a depth map as further described below.

An edge detection and depth data generation module 148 is adapted to identify edges in image data sets and to identify detectable edges as hard edges or soft edges. As explained further below, the edge detection and depth data generation module 148 identifies hard and soft edges in a plurality of image data sets collected by the image capture device 110 of a single scene. The plurality of image data sets are collected with the image capture device 110 set to focus at a plurality of focus positions at a plurality of respective distances, such as two or more of a closest focus distance, a distance selected by an auto focus system for an assumed subject of the scene, infinity, etc. Once the edge detection and depth data generation module 148 identifies the edges in the plurality of image data sets collected at the different focus distances, the edge detection and depth data generation module 148 identifies what edges of what objects in the scene present hard edges and, thus, are in focus or closer to being in focus at the different focus distances. Thus, the edge detection and depth data generation module 148 identifies a depth relative to the image capture device 110 of objects in the image data sets using two-dimensional image data collected by the image capture device 110.

The image data, depth data, and any combination thereof is passed to a compression and storage module 150 that generates the processed image data 160 presented to the image storage system 170. The image storage system 170 may include any type of storage medium, such as one or more display buffers, registers, caches, Flash memory elements, hard disks, any other storage device, or any combination thereof. The output 180 of the system 100 provides the processed image data 160 including depth data included in the processed image data 160. The output 180 may be provided from the image storage device 170 as shown in FIG. 1 or be provided from the image processing system 140.

In a particular embodiment, the edge detection and depth data generation module 148 applies kernel filters or kernels to the image data to evaluate the differentials between image data points and the ratios of the differentials to identify edges as hard or soft. As used herein, the term "differential" is used to indicate one or more differences in value between two image data points in a set of image data. In other words, as described further below, the differential can be regarded as a slope of a line or curve joining two image data points. The kernel includes a matrix of coefficients or weights applied to measured values for a range of points around a selected point. In an illustrative embodiment, the matrix is a 3×3 or a 5×5 matrix and, thus, is much smaller than the actual set of image data to which it is applied. To filter the image data, the kernel is successively applied to neighborhoods of all of the points or selected points in the image data. For example, when a 5×5 kernel is used, the kernel is applied to 5×5 ranges of points centered about each point under study to selectively apply the coefficients or weights to amplify the data values to aid in determining whether each point under study is indicative of being part of a hard edge, a soft edge, or no edge at all.

In a particular embodiment, the output 180 is coupled to a wireless transmitter (not shown) to provide real-time video data transmission. The real-time video data transmission may enable real-time wireless telephony. Using the depth data, the real-time video telephony may include enhanced foreground resolution, background suppression, or some other combination of enhancement or suppression of portions of a scene based on the depth of the portions of the image.

Figure 2:
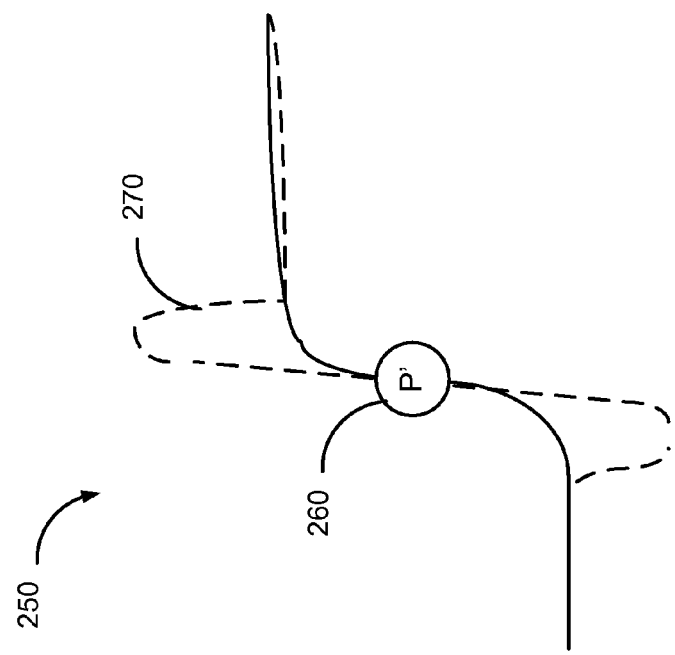
FIG. 2 is a pair of graphs depicting a particular illustrative embodiment of signals enhanced to amplify edge characteristics potentially included in the signals.
Figure 2:
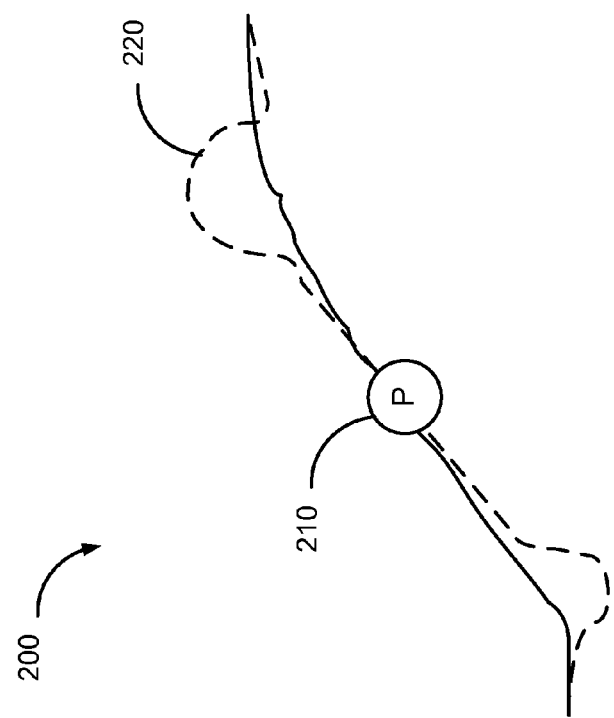

FIG. 2 shows graphs depicting a pair of curves 200 and 250 representing examples of how a soft edge and a hard edge, respectively, may appear in image data over a series of points along an axis of an image data set. In seeking to identify hard and soft edges, an edge detection module or system, such as the edge detection and depth data generation module 148 of FIG. 1, may apply a kernel filter or kernel to the points in the image data to magnify or exaggerate differences between adjacent points. For example, applying a kernel to a point P 210 applies weighted coefficients to surrounding data points to exaggerate the differential between the value of the point P and surrounding data points to yield a modified curve 220. For purposes of example, it is assumed that the first curve 200 represents a sampling of points along a soft edge and that the second curve 250 represents a sampling of points along a hard edge. Applying the weighted values of the kernel to the first curve 200 yields the first modified curve 220. The exaggerated contours of the first modified curve 220 may clarify that an edge exists but that, even with the exaggerated form of the first modified curve 220, the first modified curve 220 may be identified as a soft edge. By contrast, applying a kernel to a point P' 260 yields a second modified curve 270 that may clarify that the edge is a hard edge. Examining differentials of portions of the second modified curve 270, the ratios of the differentials, or a combination thereof enables the edge to be classified as a hard edge. As further explained below, the modified curves 220 and 270 are examined to determine differentials of the modified curves 220 and 270, ratios of the differentials of portions of the modified curves 220 and 270, or any combination thereof to identify whether the modified curves signify hard or soft edges. The application of the kernels, as well as exemplary kernels and kernel values, are further described below.

Figure 3:
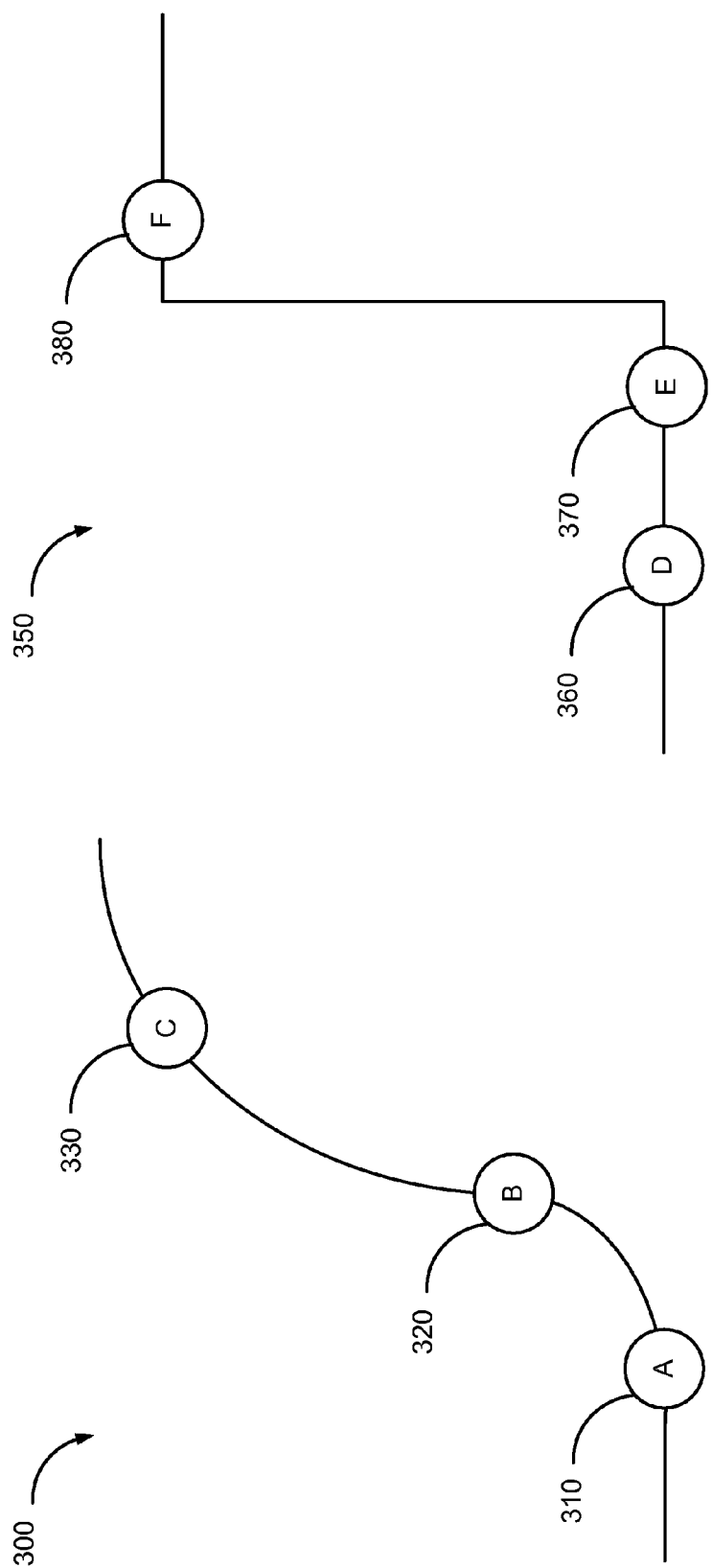
FIG. 3 is a pair of graphs depicting a particular illustrative embodiment of signals representing soft and hard edges sampled at three points.

FIG. 3 is a graphical representation of two hypothetical modified curves 300 and 350 for two sets of three data points. The curves 300 and 350 are presented to illustrate how the differentials and their ratios may be used to identify soft and hard edges in image data. Values of the data points represented on vertical axes of the graphical representations of FIG. 3 increase by the same amount in both modified curves 300 and 350. However, rates at which the values of the data points increase differs between the two modified curves 300 and 350, indicating presence of a soft edge in a first modified curve 300 and presence of a hard edge in a second modified curve 350.

The first set of data points 300, including points A 310, B 320, and C 330, represent a soft edge in which an image intensity of the points A 310, B 320, and C 330 shifts gradually from a low value of point A 310 to a higher value of point B 320 and then a next higher value of point C 330. The relatively gradual increase in intensity value from point A 310 to point B 320 to point C 330 along the first modified curve indicates presence of a soft edge. By contrast, the second modified curve 350 includes points D 360, E 370, and F 380 and represents a hard edge. The second modified curve 350 depicts an image intensity that shifts relatively sharply between the intensity values of points D 360 and E 370 and the intensity value of point F 380. The relatively sharp increase of the image intensity between point E 370 and point F 380 as compared with the shift of image intensity between point D 360 and point F 380 indicates the presence of a hard edge.

Although the first modified curve 300 and the second modified curve 350 represent soft and hard edges that may be identified by increasing intensity values ("rising edges"), soft and hard edges may also be identified by decreasing intensity values ("falling edges"). For example, in another embodiment where an intensity value of point A is 200, an intensity value of point B is 100, and an intensity value of point C is 0, the relatively gentle decrease in intensity values from point A to point B to point C may indicate a soft falling edge. Accordingly, the magnitudes or absolute values of intensity differences between points may be compared to accommodate detection and identification of soft edges and hard edges, both rising and falling. For example, a comparison between the magnitude of the intensity change from point A to point C and a magnitude of the intensity change from point B to point C may be used to identify rising or falling soft edges as well as rising or falling hard edges.

The sets of points represented by the curves 300 and 350 may represent different points within an image showing, respectively, soft and hard edges in the image data. Alternatively, the sets of points represented may show the same three points in two sets of image data of the same scene. The first modified curve 300 may represent a soft edge of an object caused by the edge of the object not being in focus because the object was at a different depth in the scene from a point at which the scene was in focus. The second modified curve 350 may represent a hard edge of an object resulting from the object being in focus and, thus, sharply defined. In this case, according to embodiments of the present disclosure, by determining whether the edge is softly defined at a first known focus distance or focus position but sharply defined at second, third, or other known focus distance, or vice versa, a relative depth of the object in the scene may be determined. By successively making hard/soft edge determinations for one or more objects in a scene, a depth map can be created for the scene with depth data being associated with each of the objects in the scene.

Embodiments of the present disclosure may identify hard and soft edges in a single-pass process by applying a kernel to sample a two-dimensional signal along one axis of the image at three points, for example, points A 310, B 320, and C 330 or points D 360, E 370, and F 380. Embodiments of the present disclosure then use a ratio of a first derivative of the leading points, such as points B 320 and C 330, over a second derivative of the lagging points from the first point to the third point, such as points A 310 and C 330, as graphically depicted in FIG. 4.

Figure 4:
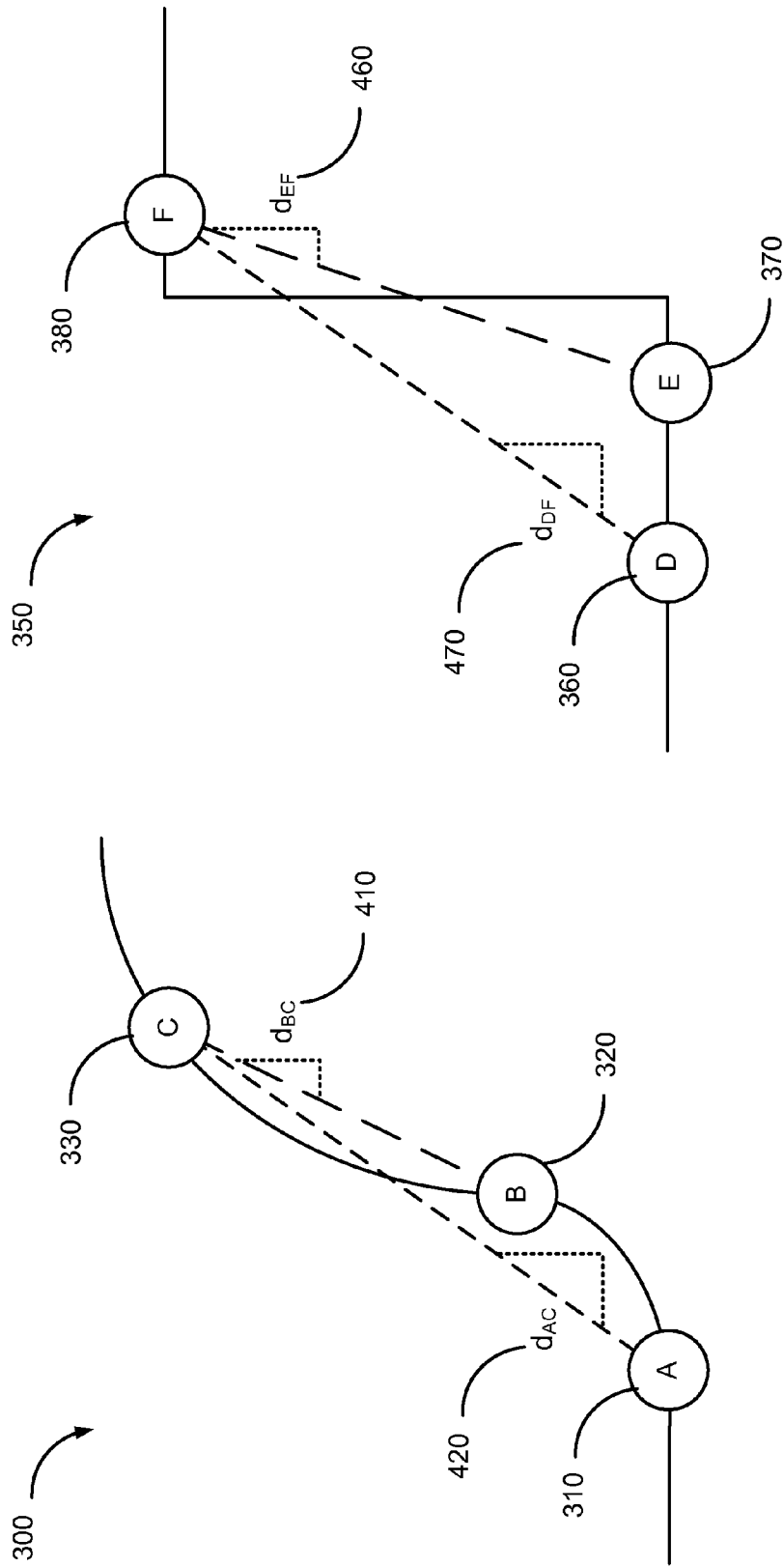
FIG. 4 is the pair of graphs of FIG. 3 illustrating differentials of lines between the points at which the signals are sampled are analyzed.

FIG. 4 graphically illustrates the differential of these points as a slope of a line joining the points. In FIG. 4, considering the first modified curve 300 associated with the soft edge, a differential or slope of a line between leading points B 320 and C 330 is represented as $d_{BC}$ 410 and a differential of a line between lagging points A 310 and C 330 is represented as $d_{AC}$ 420. Visual inspection of FIG. 4 indicates that a difference between the differentials $d_{BC}$ 410 and $d_{AC}$ 420 is relatively slight. By contrast, considering the second modified curve 350 associated with a hard edge, a differential of a line between leading points E 370 and F 380 is represented as $d_{EF}$ 460 and a differential of a line between lagging points D 360 and F 380 is represented as $d_{DF}$ 470. As depicted in FIG. 4, a difference between the differentials $d_{EF}$ 460 and $d_{DF}$ 470 is, at least, larger than the difference between the differentials $d_{BC}$ 410 and $d_{AC}$ 420. Thus, when it is not know whether an edge is hard or soft, the ratios of the differentials can be used to classify the edges as hard or soft.

Figure 5:
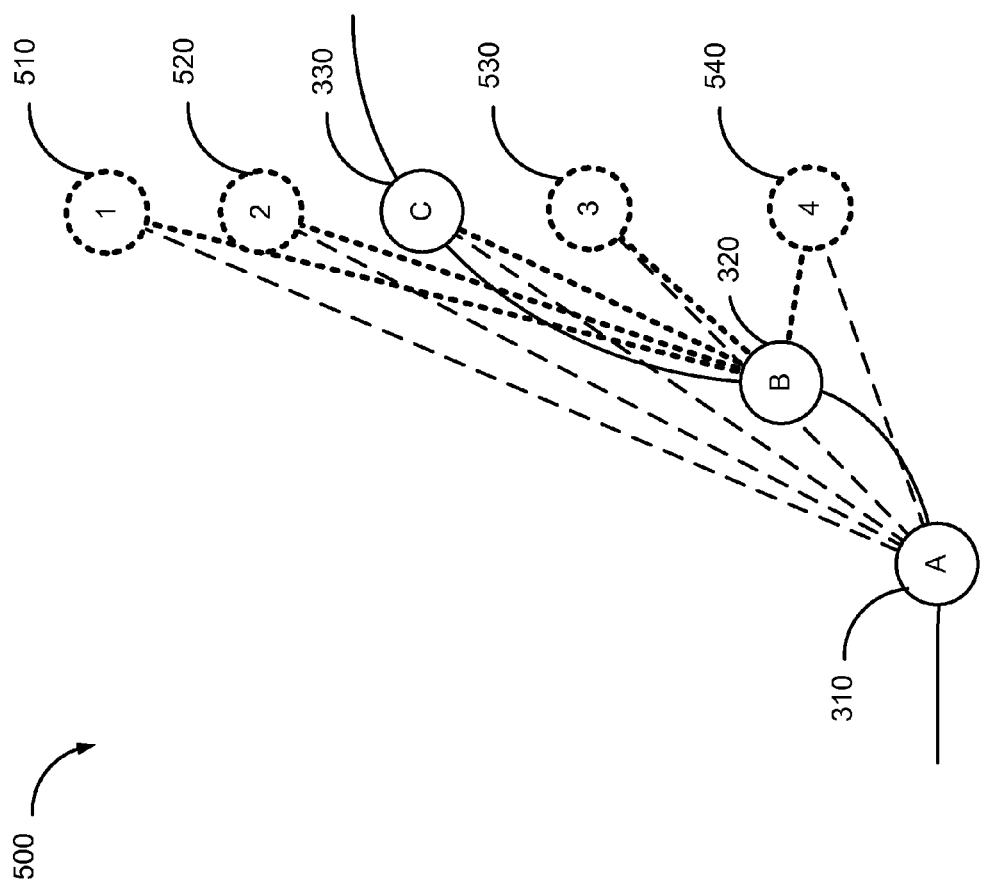
FIG. 5 is a graph of a particular illustrative embodiment of a signal sampled at three points over which threshold points for edge classification are superimposed.

FIG. 5 illustrates hypothetical differential thresholds that may be used to classify differentials and ratios of the differentials as being indicative of a hard or soft edge. In FIG. 5, differentials between sets of leading points are shown by dotted lines from actual values for points A 310, B 320, and C 330 to empirically selected values at point 1 510, point 2 520, point 3 530, and point 4 540. Differentials between sets of lagging points are shown by dashed lines between the respective points.

In addition to increases in magnitude of the values represented being indicative of the presence of an edge, the differentials between points and ratios of these differentials may indicate whether an edge is a soft edge or a hard edge. A larger ratio between the leading differential and the lagging differential is indicative of a hard edge, such as illustrated by the ratio of differentials $d_{EF}$ 460 and $d_{DF}$ 470 of FIG. 4. Thus, for example, if the ratio was of the leading differential between point B 320 and point 1 510 and the lagging differential between point A 310 and point 1 410, the ratio would indicate a hard edge. On the other hand, if the ratio of the leading differential between points B 320 and 3 530 and the lagging differential between point A 310 and point 3 530 is close to one, indicating that lines representing the leading differential between points B 320 and 3 530 and the lagging differential between point A 310 and point 3 530 are generally co-linear, the ratio would indicate a soft edge. Thus, by determining a ratio of the differentials and comparing them to selected thresholds, an efficient determination can be made as to whether an edge is hard or soft.

Coefficients used in the kernel control the effectiveness of the kernel in detecting hard edges, soft edges, or both hard and soft edges. For example, the following first order kernel of kernel (1) is effective at identifying hard edges:

$$\begin{bmatrix} -1 & -1 & -1 & -1 & -1 \\ -2 & -2 & -2 & -2 & -2 \\ 6 & 6 & 6 & 6 & 6 \\ -2 & -2 & -2 & -2 & -2 \\ -1 & -1 & -1 & -1 & -1 \end{bmatrix} \begin{bmatrix} -1 & -2 & 6 & -2 & -1 \\ -1 & -2 & 6 & -2 & -1 \\ -1 & -2 & 6 & -2 & -1 \\ -1 & -2 & 6 & -2 & -1 \\ -1 & -2 & 6 & -2 & -1 \end{bmatrix} \quad (1)$$

However, kernel (1) does not identify soft edges. It should be noted that the "order" in so-called first order and second order kernels do not refer to sequential orders of magnitude, where one is a first order of magnitude, ten is a second order of magnitude, one-hundred is a third order of magnitude, etc. Instead, the orders of magnitude refer to a first order of magnitude, such as a single-digit value, as a first order of magnitude, and whatever the next order of magnitude is, such as one-thousand, as a second order of magnitude.

For further example, the following second order kernel of kernel (2) is more effective than kernel (1) in identifying soft edges:

$$\begin{bmatrix} 0 & -1 & -2 & -1 & 0 \\ 0 & 0 & 0 & 0 & 0 \\ 0 & 2 & 4 & 2 & 0 \\ 0 & 0 & 0 & 0 & 0 \\ 0 & -1 & -2 & -1 & 0 \end{bmatrix} \begin{bmatrix} 0 & 0 & 0 & 0 & 0 \\ -1 & 0 & 2 & 0 & -1 \\ -2 & 0 & 4 & 0 & -2 \\ -1 & 0 & 2 & 0 & -1 \\ 0 & 0 & 0 & 0 & 0 \end{bmatrix} \quad (2)$$

However, kernel (2) is still more sensitive to hard edges than soft edges, and may be sensitive to noise and textures.

Embodiments of the present disclosure apply a kernel selected to identify both hard and soft edges. For example, embodiments of the present disclosure may apply a 5×5 second order kernel to a 5×5 point neighborhood of 8-bit data values centered about a selected point currently under study.

An example of a kernel operable to identify both hard edges and soft edges is given by kernel (3):

$$\begin{bmatrix} 0 & 0 & 0 & 0 & 0 \\ -1 & 0 & -1000 & 0 & 1001 \\ -2 & 0 & -2000 & 0 & 2002 \\ -1 & 0 & -1000 & 0 & 1001 \\ 0 & 0 & 0 & 0 & 0 \end{bmatrix} \quad (3)$$

The kernel (3) includes two rows that include only zero values, the first row and the last, fifth row. The kernel (3) also includes three rows that include non-zero values: the second row of the kernel (3) includes the values −1, 0, −1000, 0 and 1001; the third row of the kernel includes the values −2, 0, −2000, 0 and 2002, and the fourth row of the kernel includes the values −1, 0, −1000, 0 and 1001. Thus, each of the three non-zero rows has a negative first order of magnitude value of −1 or −2, a negative second order of magnitude value of −1000 or −2000, and a positive first order of magnitude value that has a component of the first order of magnitude, such as 1 of the value −1 included in the value 1001. As described further below, selecting kernel values with first and second orders of magnitude enables the edge detection module 148 to identify two or more differentials of the selected data points in a single pass.

The orders of magnitude for the non-zero values in the kernel may be selected based on the type of signal being analyzed. The kernel (3) may be particularly well-suited for an eight-bit digital image signal in which an intensity of each pixel value is represented using an eight-bit value resulting in a base-ten value between zero and 255. The second order of magnitude selected for the non-zero values is selected such that there is little or no chance that the sum of the pixel values, when multiplied by the first order non-zero components of a column, will overflow into the second order of magnitude. Using an eight-bit image as an example, the sum of the maximum pixel value 255 multiplied by the first order of magnitude values of the kernel (3), −1, −2 and −1, is equal to 1*255+(2*255)+1*255 or 1020, which overflows into the second order of magnitude values of kernel (3) of −1000, −2000, 1001, and 2002. Thus, overflow into the second order of magnitude values of kernel (3) are possible for pixel values of 250 or higher.

It may be unlikely that each of the pixels in the respective positions will present an eight-bit value of 250 or more and, thus, overflow into the second order of magnitude of the kernel (3). Notwithstanding the unlikelihood of a condition that will cause an overflow into the second order of magnitude of the kernel (3), selecting a larger second order of magnitude, such as 10,000, eliminates the possibility of overflow. For signals represented with larger or smaller numbers of bits, non-zero values with larger or smaller orders of magnitude may be used. For a 16-bit image, for example, non-zero values with larger orders of magnitude, such as 1,000,000, may be used. On the other hand, for a 2-bit signal, non-zero values with smaller orders of magnitude, such as 100, may be used. Thus, the second order of magnitude of the non-zero values of the kernel may be selected as a function of a maximum possible value of the signal to appropriately magnify the data values in seeking to classify an edge as a hard edge or a soft edge.

To apply the kernel (3) and derive the differentials to identify edges in the image, an edge detection module, such as the edge detection and depth data generation module 148 of FIG. 1, applies the kernel to each of the points in the set of image data. The edge detection module 148 identifies a selected point and reads the data values for the selected point and the neighboring points. In choosing to analyze 5×5 point neighborhoods and a 5×5 kernel, the analysis of the image begins with a point in the third row and third column of the image to ensure that values are available for at least two points left, right, above, and below the selected point. The edge detection module 148 then applies the kernel (3) by calculating a convolution for the kernel and the data values around the selected point to compute a sum of the kernel multiplied by the pixel values. Each of the data values identifying the intensity associated with each of the points is multiplied by the value of the corresponding location within the kernel to obtain weighted point values. The weighted point values are then summed. For selected points on an edge of an image, for which the range of data may not include points to the left, to the right, above, or below the selected point, these points may be skipped. Alternatively, values for these points may be extrapolated or interpolated from available points in a neighborhood of the selected point or supplied with values from any other suitable process.

For illustration, the kernel (3) is applied to a range of data values represented by the matrix (4), below. From the smoothly varying but steadily increasing data values of the matrix (4), the selected point at the center of the data values can be inferred to be on a soft edge:

$$\begin{bmatrix} 10 & 20 & 30 & 40 & 50 \\ 10 & 20 & 30 & 40 & 50 \\ 10 & 20 & 30 & 40 & 50 \\ 10 & 20 & 30 & 40 & 50 \\ 10 & 20 & 30 & 40 & 50 \end{bmatrix} \quad (4)$$

The convolution of kernel (3) and matrix (4) return summed values given by equation (1):

$$-40-120{,}000+200{,}200=80{,}160 \quad (1)$$

Applying a division by 1000 or "div 1000" operation and a modulo 1000 or "mod 1000" operation yields a differential of the leading edge of the signal of 80 and a differential of the lagging edge of the signal of 160. To normalize the two values to a slope measurement over five pixels, the leading edge result is multiplied by two, yielding differentials of 160 and 160. The ratio of the leading edge differential and the lagging edge differential thus is one, indicating a gradual differential indicative of a soft edge.

For further illustration, the kernel (3) is applied to a signal represented by the matrix (5), in which the intensity values do not increase smoothly, thereby suggesting a hard edge may be present:

$$\begin{bmatrix} 10 & 10 & 10 & 50 & 50 \\ 10 & 10 & 10 & 50 & 50 \\ 10 & 10 & 10 & 50 & 50 \\ 10 & 10 & 10 & 50 & 50 \\ 10 & 10 & 10 & 50 & 50 \end{bmatrix} \quad (5)$$

The convolution of kernel (3) and matrix (5) returns summed values given by equation (2):

$$-40-40{,}000+200{,}200=160{,}160 \quad (2)$$

Applying a division by 1000 or "div 1000" operation and a modulo 1000 or "mod 1000" operation yields a differential of the leading edge of the signal of 160 and a differential of the lagging edge of 160. To normalize the two results in to a differential measurement over five pixels, the leading edge result is multiplied by two, yielding differentials of 320 and 160. The ratio of the leading and lagging slopes thus is two. This indicates that the edge is not rising uniformly, as in the case of the previous signal represented by matrix (4). Because the edge is not rising uniformly, the edge is classifiable as a hard edge.

Using the leading edge differential, the lagging edge differential, and the ratio of the leading edge differential to the lagging edge differential derived from the application of the kernel (3) to the matrices of data values (4) and (5), whether the selected point at the center of the data values indicates a hard or soft edge may be determined by comparing the differentials and their ratios to predetermined thresholds using IF-type statements, lookup tables, or other programming or circuitry structures.

In one embodiment of processing data to classify data values around a selected point as being indicative of a hard or soft edge because the differential of the leading edge spans a greater distance than the differential of the lagging edge, the differential of the leading edge is designated termed a wide edge or "w-edge" and the differential of the lagging edge is designated as the narrow edge or "n-edge." The n-edge, the w-edge, and the ratio of the n-edge to the w-edge are used to determine if, in fact, the data values indicate a presence of an edge at all. If the differentials indicate the presence of an edge, the ratio of the differentials is considered to determine if the edge is a soft or hard edge:

--- if (w-edge > 120 && // slope of wide, lagging edge
    (across 5 pixels) has to be large enough to indicate an edge
w-edge < 300 && // but if slope of wide edge is too large, it will not be a soft edge
    n-edge > 25 && // slope of narrow, leading edge (across 2 pixels) has to be large enough to indicate an edge
n-edge < 300 && // but if slope of narrow edge is too large, it will not be a soft edge
ratio < 1.6 && // ratio of leading/lagging slopes has to be close or the edge will not be a narrow edge
ratio > 0.4
)

---

Based on the same computational analysis in applying the kernel to the points in the image data, the differentials and their ratio may be evaluated to determine if a hard edge is present. As previously described, in determining whether the data values indicated presence of a soft edge, it was determined whether the data indicated an edge of any type was present as well as whether the edge was a soft edge. If the data values indicated presence of an edge, but the edge was determined not to be a soft edge, the process of determining whether the edge should be classified as a hard edge may be relatively short:

if ((n-edge>300&&//slope of narrow, leading edge
    must be large to indicate a hard edge (ratio>1.5||ratio<0.9))//ratio of slope of leading edge
    to slope of lagging edge must vary appreciably to indicate a hard edge The process of applying kernels to the matrices of data points in the image data may be substantially optimized or modified to reduce the computational processes. In one embodiment of the present disclosure, the 5×5 kernel, such as the 5×5 kernel (3) previously described could be reduced to a 3×3 matrix by eliminating the zero values of the matrix as presented in kernel (6) to yield 3×3 kernel (7):

$$\begin{bmatrix} 0 & 0 & 0 & 0 & 0 \\ -1 & 0 & -1000 & 0 & 1001 \\ -2 & 0 & -2000 & 0 & 2002 \\ -1 & 0 & -1000 & 0 & 1001 \\ 0 & 0 & 0 & 0 & 0 \end{bmatrix} \quad (6)$$

$$\begin{bmatrix} -1 & -1000 & 1001 \\ -2 & -2000 & 2002 \\ -1 & -1000 & 1001 \end{bmatrix} \quad (7)$$

Using the 3×3 kernel (7) that eliminates the zero values applied to 3×3 matrices of data values processes the data values as though a 5×5 kernel were being applied to a 5×5 matrix of data values. Thus, the result of applying a 3×3 kernel to a 3×3 matrix of points is as substantively rigorous as applying a 5×5 kernel to a 5×5 matrix of points, but with fewer calculations involved in applying the kernel to the data matrices.

Furthermore, instead of applying div 1000 and mod 1000 operations to yield the height of the two spans of the data points, the div and mod operations may be performed using 1024, which is a multiple of two and thus enables use of a faster shift operator in a binary processing system. Substituting 1024 in the kernel (7) to accommodate the div 1024 and mod 1024 operations, the kernel (7) is modified to yield a modified 3×3 kernel (8):

$$\begin{bmatrix} -1 & -1024 & 1025 \\ -2 & -2048 & 2050 \\ -1 & -1024 & 1025 \end{bmatrix} \quad (8)$$

Performing an edge detection process as previously described to a series of image data sets collected for a scene, a depth map or another collection of depth data can be generated for the scene. According to a particular embodiment of the present disclosure, multiple sets of image data are captured for a single view at a plurality of different focus distances. Then, by monitoring the focus distance at which each of the image data sets is captured and at what focus distances edges of objects in the scene become hard or soft, depth data can be associated with the objects.

FIG. 6 shows a scene generally designated 600 of which image data is captured using an image capture device 602. An axis of increasing distance 604 from the image capture device 602 spans from a foreground or foreground portion 606 of the scene 600 to a background or background portion 608 of the scene 600. The scene includes three objects: a square 612, a circle 614, and a triangle 616. As shown in FIG. 7, if each of the objects 612, 614, and 616 were captured in an image data set in which each of the objects were in focus, the image data set would yield a visual representation such as image 710. In image 710, a representation of the square 712 partially overlaps a representation of the circle 714 which, in turn, partially overlaps a representation of the triangle 716. For purposes of simplicity, in subsequent images included in the figures, the name of the object will be used to signify a view or representation of the object. Thus, for example, a view or a representation of the square 712 will be termed the square 712.

Figure 8:
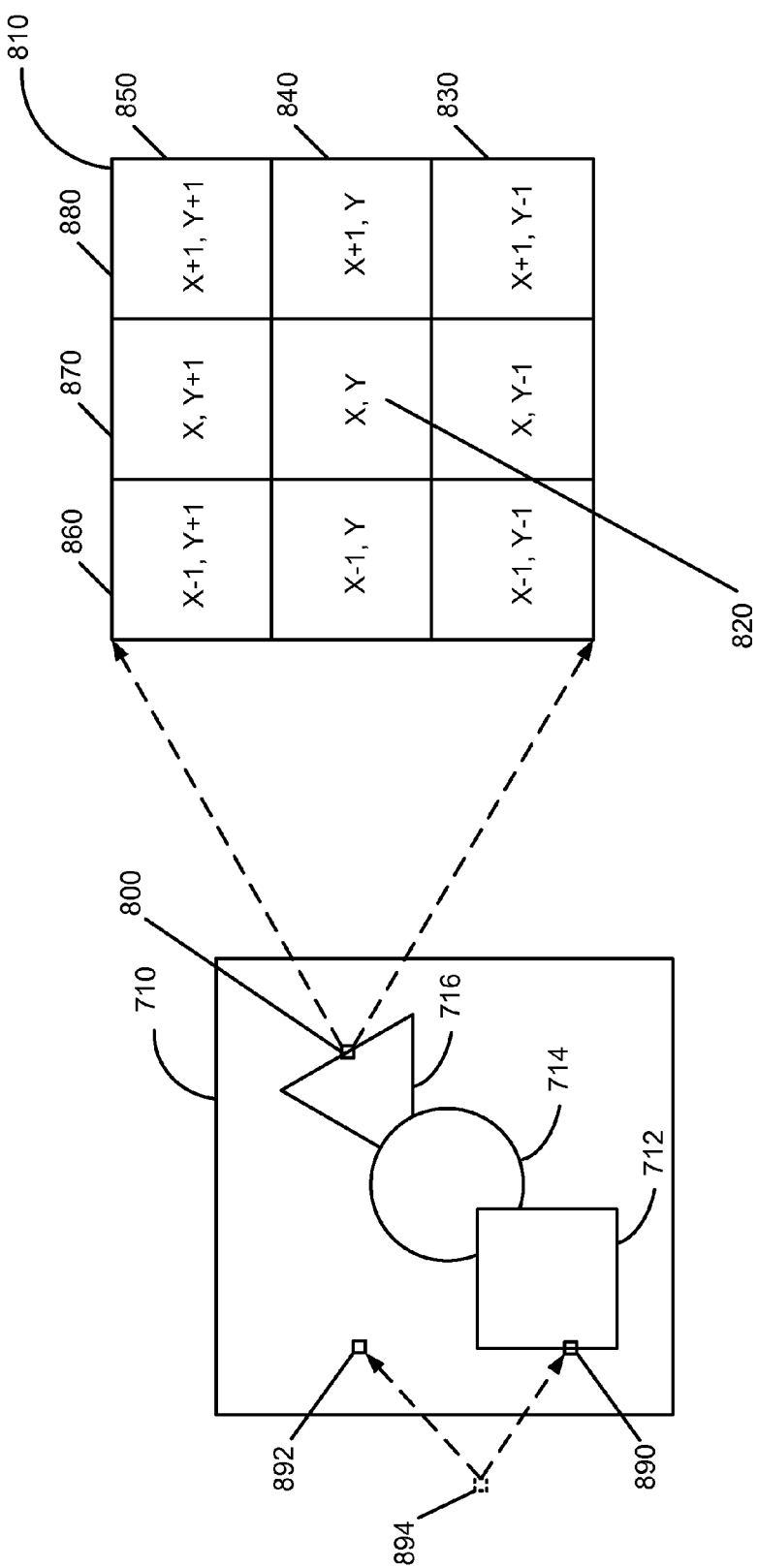
FIG. 8 is a particular illustrative embodiment of a range of points sampled about a selected point from the image data set of FIG. 7.

FIG. 8 is a particular illustrative embodiment of portions of image data from the image 710 of FIG. 7 that is sampled to perform edge detection and depth data determination. A portion of the image data 800 is enlarged to show a range of points 810 sampled about a selected point 820. As previously described, a 3×3 range of points processed using a 3×3 kernel may be used to perform reliable edge detection based on intensity values in the range of points 810. Thus, for the selected point 820, a suitable range is of points is collected from a row below 830 the selected point 820, a row 840 of the selected point 830, a row above 850 the selected point 820, a column to left 860 of the selected point 820, a column 870 including the selected point 820, and a column to the right 880 of the selected point 820. Alternatively, a larger range of points, such as a 5×5 range of points could be used and processed using a 5×5 kernel.

Data for ranges of points are thus collected for portions of the image data, such as a first portion of the image data 890 and a second portion of the image data 892. The first portion 890 may include a portion of a foreground of the image data and the second portion 892 may include a background of the image data, or portions of the image data at any other point in the scene. By processing the portions of the image data 890 and 892 as previously described, such as by the application of a kernel 894 to each of the portions of the image data 890 and 892, the portions of the image data 890 and 892 will be classified as indicating absence of an edge or presence of an edge. For example, for the first portion of the image data 890 that includes an edge of the square, the presence of an edge may be detected. On the other hand, for the second portion of the image data 892 that does not include any of the objects in the scene, no edge will be detected. For portions of the image data in which an edge is detected, the edge may then be classified as a hard edge or a soft edge.

Figure 9:
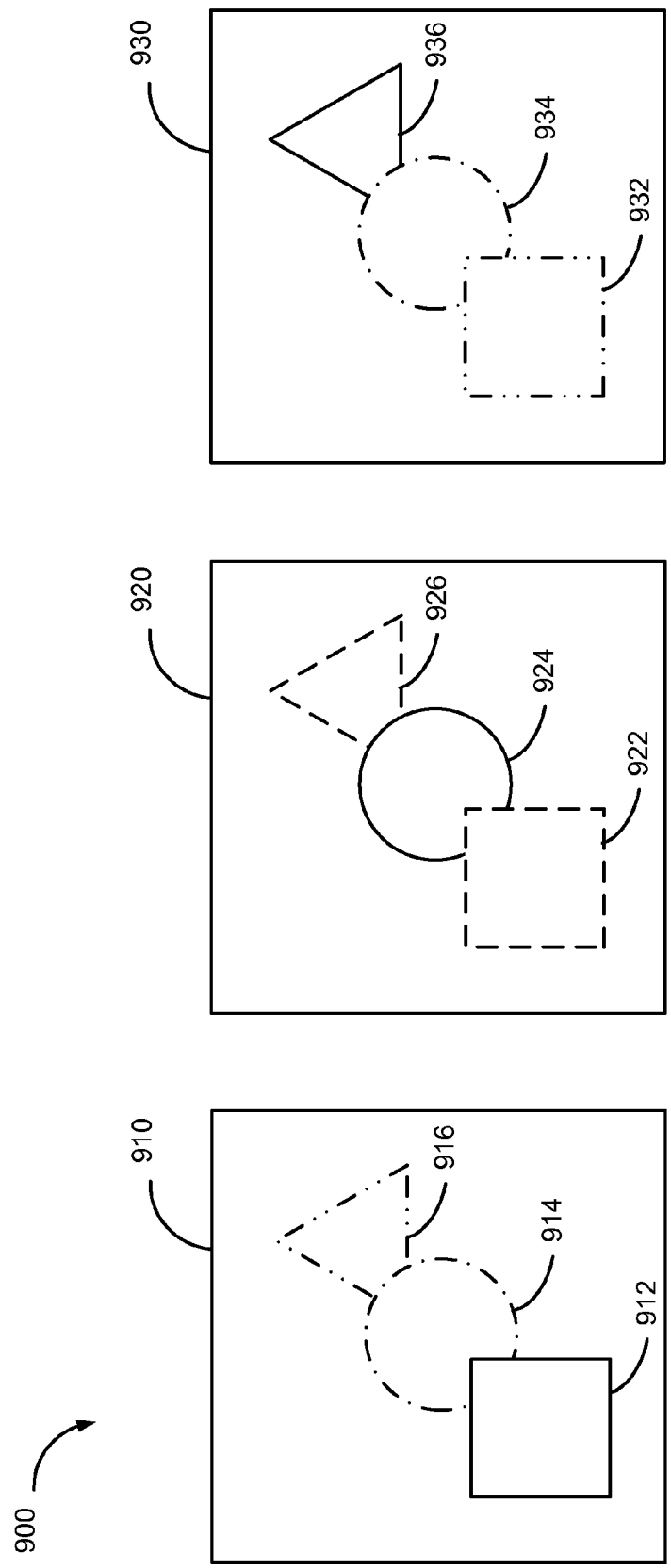
FIG. 9 is a diagram of a particular illustrative embodiment of a series of image data sets captured at different focus distances indicating a plurality of objects in and out of focus in each image data set.

FIG. 9 shows a series of different image data sets generally designated 900 for a single scene including a plurality of objects. The series of image data sets 900 is used as an example to illustrate how embodiments of the present disclosure use detection of hard and soft edges in image data to generate depth data. The series of image data sets 900 correspond to the scene 600 of FIG. 6 as captured at various focus distances by the image capture device 602.

The first image 910 is an image recorded with an image capture device focused on an object at a first, close focus distance, such as a macro focus distance. In the first image 910, a square 912 in a foreground of the first image is depicted as having a solid outline to reflect that, visually, the square 912 is in focus at the first focus distance. Behind the square 912 is a circle 914 partially blocked by the square 912 in the foreground. The circle 914 is presented with a single-dotted outline to reflect that, visually, the circle 914 is not in focus at the first focus distance. Behind the circle is a triangle 916, partially blocked by the circle 914 appearing in front of the triangle 916. The triangle 916 is presented with a double-dotted outline to reflect that, visually, the triangle 916 is more out of focus than the circle 914 at the first focus distance.

The second image 920 is an image recorded at a second focus distance that is greater than the first focus distance. The second image 920 is focused on a center of the image where the circle 924 is located. The circle 924 is depicted as having a solid outline to reflect that the circle 924 is in focus at the second focus distance. In the foreground, the square 922 is presented with a dashed outline to reflect that, visually, the square 922 is not in focus at the second focus distance. The triangle 926 also is presented with a dashed outline to reflect that the triangle 926 is again out of focus at the second focus distance, but less so than in the first image 910.

The third image 930 is an image recorded at a third focus distance in which the image is focused at or toward infinity, bringing the triangle 936 into focus. The triangle 936 is depicted is depicted as having a solid outline to reflect that the triangle 936 is in focus in the third image 930 at the third focus distance. In the foreground, the square 932 is presented with a double-dotted outline to reflect that, visually, the square 932 is further out of focus than at the second focus distance. The circle 934 is presented with a single-dotted outline to reflect that the circle 934 is still out of focus at the third focus distance, but more in focus than the square 932.

Figure 10:
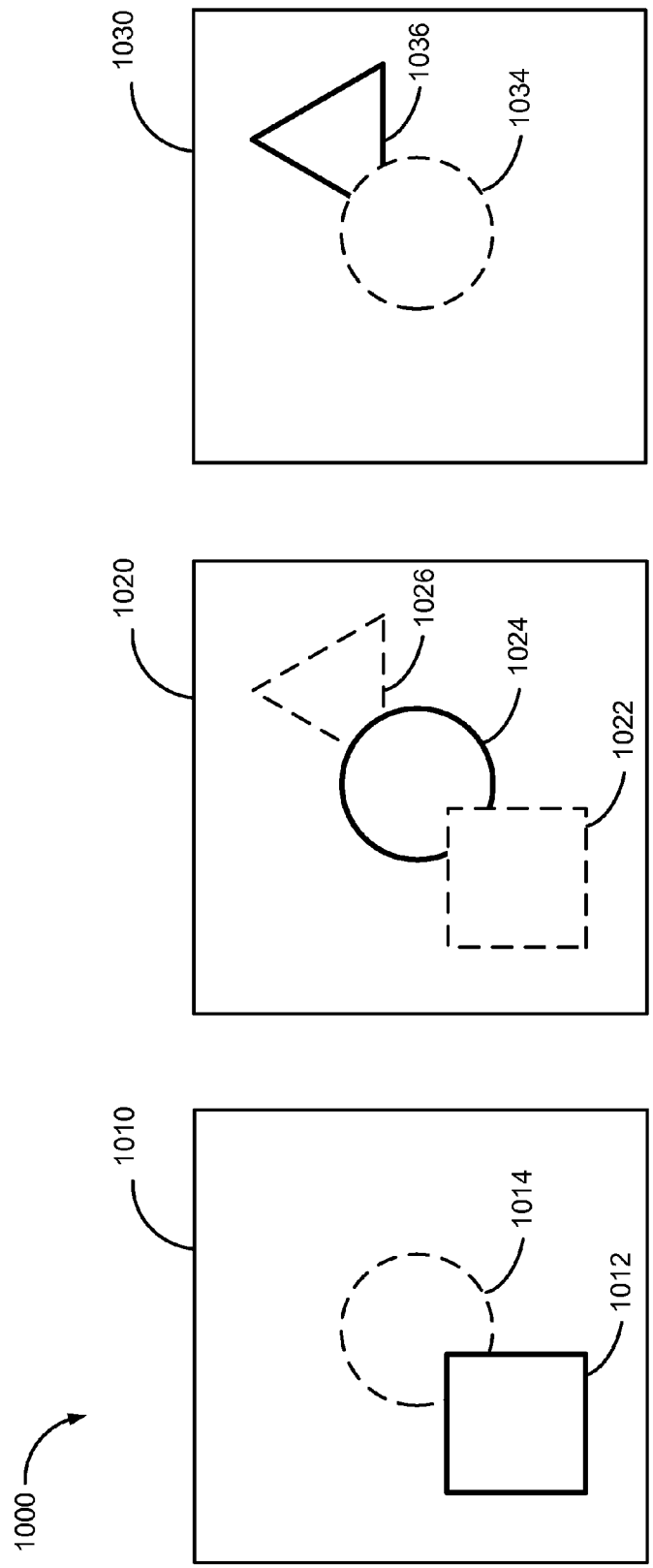
FIG. 10 is a diagram of a particular illustrative embodiment of a series of edge detection representations derived from the image data sets of FIG. 9.

FIG. 10 shows a series of edge representations generally designated 1000 corresponding with the image data sets 900 of FIG. 9. In the edge representations 1000, a hard edge is represented with a solid outline, a soft edge is represented with a dashed outline, and, where no discernible edges are detected, no outline is shown.

In a first edge representation 1010 of the first image 910 of FIG. 9, a square 1012 with a solid outline is presented in a foreground of the first edge representation 1010 indicating that the in-focus edges of the square 912 of the first image cause are identified as hard edges. A circle 1014 is presented with a dashed outline indicating the circle 914 in the first image 910 of FIG. 9 is out of focus but its edges are still discernible as presenting a soft edge at the first focus distance. No representation of the triangle 916 of the first image 910 of FIG. 9 is included in the first edge representation 1010 because its image was not sufficiently in focus for any edge to be detected.

In a second edge representation 1020 at a second focus distance, a square 1022 with a dashed outline is presented to reflect the classification of the out-of-focus square 922 in the second image 920 of FIG. 9 as having soft edges at the second focus distance. A circle 1024 is presented with a solid outline to reflect that edges of the in-focus circle 924 of the second image 920 of FIG. 9 are classified as hard edges at the second focus distance. A triangle 1024 is presented with a dashed outline to reflect that edges the out-of-focus triangle 924 of the second image 920 of FIG. 9 are classified as soft edges at the second focus distance.

In a third edge representation 1030 at a third focus distance, no representation of the square 912 and 922 of the first image 910 and the second image 920 of FIG. 9, respectively, is included because the square was too out of focus for its edges to be classified even as soft edges in the third image 930. A circle 1034 is presented with dashed edges to indicate that the out-of-focus edges of the circle 934 in the third image 930 of FIG. 9 were classified as soft edges. Finally, a triangle 1036 has a solid outline to reflect that the edges of the triangle 936 of the third image 930 of FIG. 9 are classified as hard edges at the focus distance of the third edge representation 1030.

Using the edge representations 1000 of FIG. 10 derived from the image data sets 900 of FIG. 9, depth data, such as a depth map, may be generated for objects in the scene represented in the image data sets 900. In one embodiment of the present disclosure, the generation of the depth map begins with edge analysis of the image taken at a closest focus position and checking each point in the image to determine its edge classification. The classification for each point is stored. The process then evaluates each point in the next image, at the next closest focus position, to determine if the edge classification of the point has changed. More specifically, it is determined for each of the points when, if it all, the point is classified as a hard edge at any of the focus positions. The focus position at which each of the points is associated with a hard edge is identified as the depth of the point that will be assigned to the point in depth data.

For example, in one embodiment of the present disclosure, the following algorithm is used to generate a depth map:

```
For every pixel in output image {
    See if that pixel location in the first image (taken when lens is in macro
    mode, where objects closes to lens would be in focus) is on soft, hard,
    or non-edge.
    Store this as prev_state.
    For all remaining pictures i from 1 to n-1, (in order of macro to infinity),
    do {
        see if pixel is on a hard edge, soft edge, or neither. Store this is as
        curr_state
        see if prev_state was hard, but curr_state is either soft or neither.
        if so, then mark output pixel with value indicative for frame number, i.e.
        distance
            if not, set prev_state to state and repeat for next image.
    }
}
```

Figure 11:
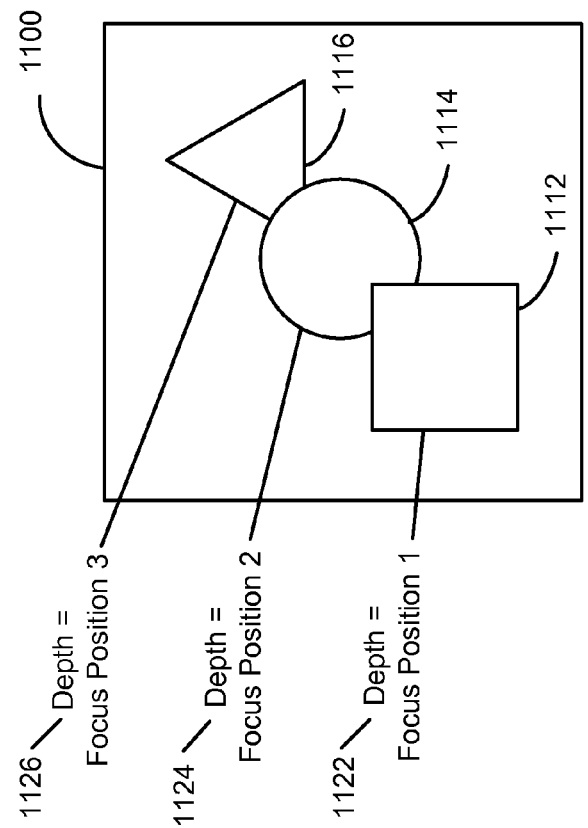
FIG. 11 is a diagram of a particular illustrative embodiment of a depth map generated from the series of image data sets of FIG. 9.

FIG. 11 represents a particular embodiment of a depth map 1150 created using a logical representation 1100 of the depth data derived from the image data sets 900 of FIG. 9 and the edge representations 1000 of FIG. 10. The logical representation of the depth data 1100 shows the focus distance for which each of the objects was in focus as indicated by the edges of the objects being identified as hard edges. The focus position at which each object came into focus is associated with each object as its depth. Specifically, the edges of the square 1112 were classified as hard edges at depth or focus distance 1 1122. Similarly, the edges of the square 1114 were classified as hard edges at depth or focus distance 2 1124, and the edges of the triangle 1116 were classified as hard edges at depth or focus distance of 3 1126.

Thus, in the depth map 1150, points at which a hard edge was identified are assigned a depth equal to the focus distance at which the hard edge was identified. Points on the edge of the square 1152 thus are assigned a depth of "1." Points on the edge of the circle 1154 are assigned a depth of "2." Points on the edge of the triangle 1156 thus are assigned a depth of "3." Points at which no hard edges were identified, such as point 1158, are assigned a depth of 0 or some other null depth value. Thus, the depth map 1150 associates image data corresponding to the images 910, 920, and 930 of FIG. 9 of the scene 600 of FIG. 6 with a numerical indication of a relative distance of each of the objects 612, 614, and 616 in the scene 600. The numerical indication indicates a relative distance of each of the objects 612, 614, and 616 from the image capture device 602. The depth map 1150 also associates a null depth value to portions of the image data in which edges were not detected. Alternatively, in the depth map 1150, each object may be assigned a depth corresponding to a focus distance at which the object lost focus, i.e., transitioned from a hard edge to a soft edge, or from a soft edge to no edge.

Figure 12:
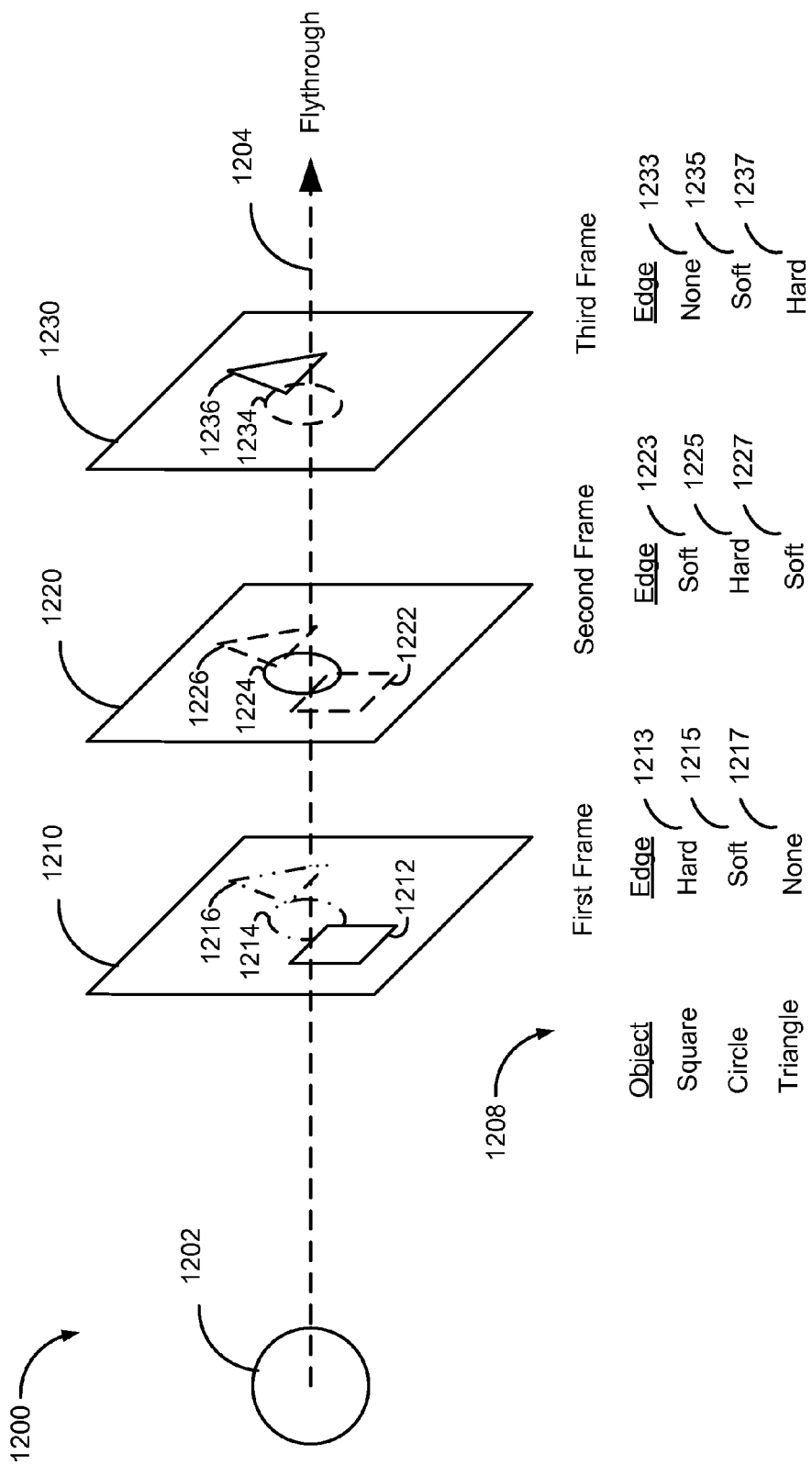
FIG. 12 is a perspective view of a particular illustrative embodiment of a series of image data sets of a plurality of objects in which the objects are classified as having hard edges, soft edges, or no detectable edges.

FIG. 12 is a perspective view of the edge representations 1010, 1020, and 1030 of FIG. 10 representing edges of the objects 612, 614, and 616 in the scene 600 of FIG. 6 classified to represent edge transitions from a near point 1202 representing the perspective of a near focus position of the image capture device 602 of FIG. 6 through a most distant focus position 1204. An edge classification table 1208 associates edge classifications with each of the objects in the scene 600, including the square 612, the circle 614, and the triangle 616, in each of a plurality of frames including a first frame 1210, a second frame 1220, and a third frame 1230. The edge classifications and transitions between the edge classifications are used to determine which of the objects 612, 614, and 616 will be presented in flythrough views of the scene 600 of FIG. 6, as described further below.

In the edge classification table 1208, edges of the square 1212 in the first frame 1210 are identified as hard edges 1213, edges of the circle 1214 are identified as soft edges 1215, and edges of the triangle 1216 were not detected and are thus classified as presenting no edges 1217. For the second frame 1220, edges of the square 1222 are identified as soft edges 1223, edges of the circle 1224 are identified as hard edges 1225, and edges of the triangle 1226 are classified as soft edges 1227. For the third frame 1230, no square appears thus the square is identified as presenting no edges 1233, edges of the circle 1234 are identified as soft edges 1235, and edges of the triangle 1236 are classified as hard edges 1237.

In one embodiment of the present disclosure, objects will be presented in frames of the flythrough view when an edge of an object first appears, whether as a soft edge or a hard edge. Upon moving to a next frame, whether moving from a current frame to a frame representing a next more distant focus position or from a current frame to a frame represent a next closer focus position, objects having the same edge classification or that transition from a soft edge classification to a hard edge classification again will be presented. On the other hand, objects for which no edge is detected for a particular focus position or for which the edge classification transitions from a hard edge to a soft edge are not presented. Thus, in a flythrough view moving from a frame at a current focus position to a next more distant focus position, when edges of an object transition from hard edges to soft edges, it is assumed that the object would pass behind the viewer as the viewer "flies into" the scene. Correspondingly, in a flythrough view moving from a frame at a current focus position to a next closer focus position, when edges of an object transition from hard edges to soft edges, it is assumed that the object passes into the background and is no longer of interest as the viewer "flies out" of the scene.

Figure 13:
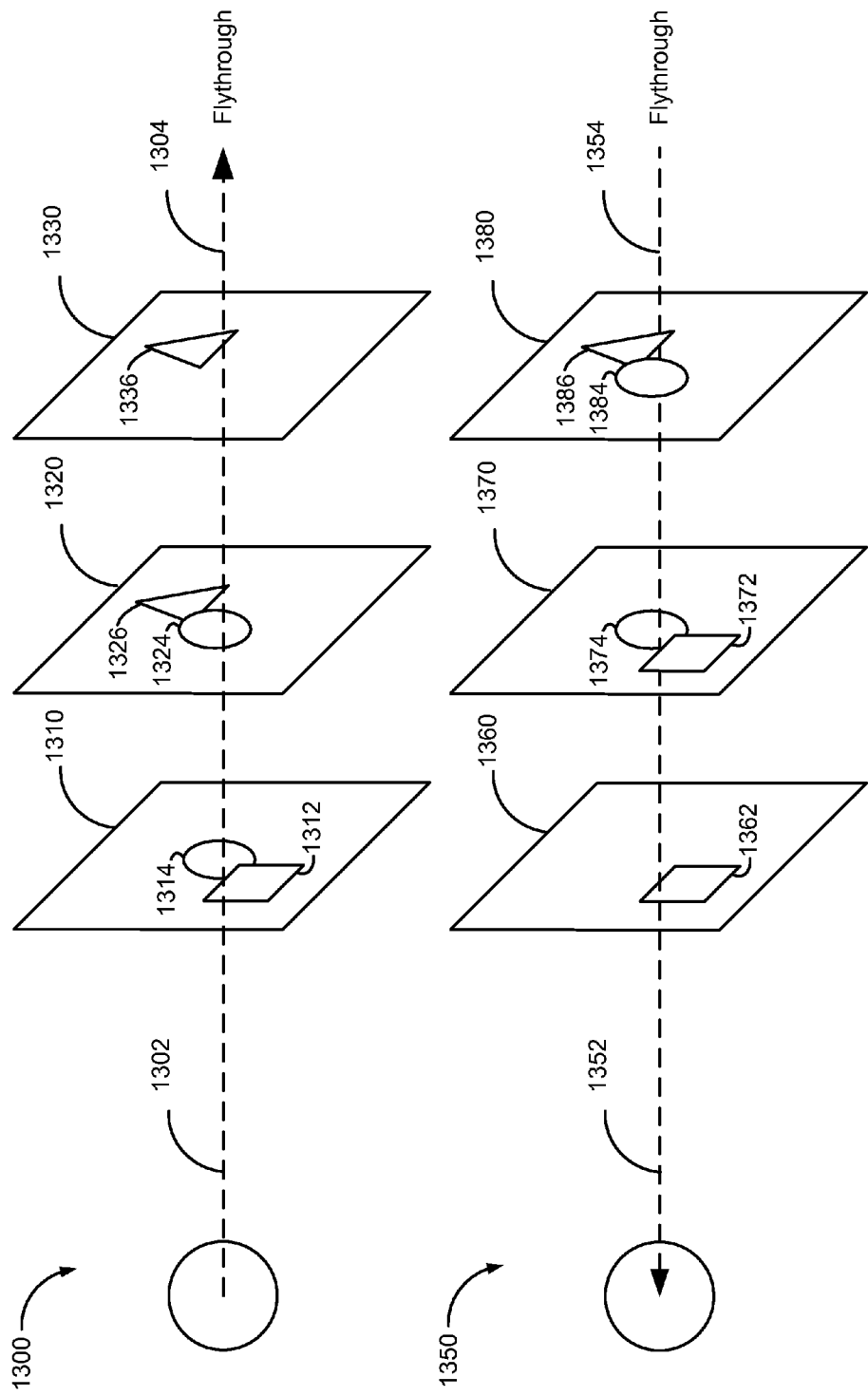
FIG. 13 is a perspective view of a particular illustrative embodiment of a pair of flythrough views for presenting image data.

FIG. 13 shows a first flythrough view 1300 of the scene 600 of FIG. 6 moving from a first frame 1310 representing a near or foreground focus position nearest a point of reference of an image capture device 1302 to a third frame 1330 representing a distant or background focus position toward optical infinity 1304. FIG. 13 also shows a second flythrough view 1350 moving from a third frame 1380 representing a distant or background focus position toward optical infinity 1354 to a third frame 1360 representing a nearest or foreground focus position 1352. In the first flythrough view 1300, in which the user is "flying into" the scene 600 of FIG. 6, a first frame 1320 shows views of a square 1312 and a circle 1314. As previously described with reference to FIG. 12, edges of both the square 1212 and the circle 1214 first appeared in the first frame 1210, thus, the square 1312 and the circle 1314 both appear in the first frame 1320. No image of the triangle appears in the first frame 1310 because the triangle was classified as having no detected edges 1217 for the first frame 1210 in FIG. 12.

Moving to the second frame 1330, views of the circle 1324 and the triangle 1326 are presented. With reference to FIG. 12, the edge classification of the circle 1224 changes from soft 1215 to hard 1225 between the first focus position and the second focus position, indicating the circle 1224 is more in focus and, thus, nearer at the second focus position of the second frame 1220. Thus, the circle 1324 is included the second view 1320. The triangle 1326 also appears in the second view 1320 because, with reference to the edge classification table of FIG. 12, edges of the triangle 1226 first are detected at the second focus position represented by the second frame 1220. No image of the square appears as in the second frame 1320 because, as indicated in the edge classification table 1208 of FIG. 12, the edge classification of the square changed from hard 1213 to soft 1223 indicating the square is moving out of focus and thus behind the viewer in the flythrough view of the second frame 1320. However, for example, if the square were still classified in the second frame 1220 as having hard edges, indicating the square was still in focus and thus not moving behind a viewer of the second frame 1220, the square would again be presented.

Moving to the third frame 1340, only a view of the triangle 1336 is presented. With reference to FIG. 12, the edge classification of the circle 1236 changes from soft 1227 to hard 1237 between the second frame 1220 at the second focus position and the third frame 1230 at the third focus position indicating the triangle 1236 is nearer and more in focus at the third focus position represented in the third view 1230. Thus, the triangle 1336 is included in the third view 1330. By contrast, the edge classification table 1208 of FIG. 12 indicates that the edge classification of the circle 1224 changes from hard 1225 to soft 1235 between the second frame 1320 and the third frame 1330, indicating that the circle is moving away from and behind the viewer in the flythrough view of the third frame 1330.

In presenting the views 1310, 1320, and 1330 to a viewer, as the viewer "flies into" the scene 600 of FIG. 6, the viewer will be presented with views including objects when they appear sufficiently in focus for their edges to be detected or when their edges become sharper and are classified as hard edges. As the viewer is presented with successive views moving toward a most distant or background focus position 1304, objects having edge classifications suggesting they are moving out of focus and, thus, further from the viewer, are removed from the view. Thus, the viewer is initially presented with a view of objects that are in focus or at least that have discernible edges, then, as the flythrough progresses, objects moving out of focus are removed from view and objects coming into focus or sharper focus are presented, just as if the viewer were "flying through" the scene as represented by the selectively inclusive views.

The flythrough view 1350 of FIG. 13, which shows the perspective changing from a most distant or background focus position 1354 to a nearest or foreground focus position 1352. The same rules are applied in the flythrough view 1350: a view of an object is presented when its edges are first detected or transition from a soft edge classification to a hard edge classification. In a third view 1380, the triangle 1386 and the circle 1384 are presented. Starting with the third view 1380 representing the most distant focus position, as indicated in the edge classification table 1208 of FIG. 12, both the triangle 1386 and the circle 1384 are first classified as having hard or soft edges, respectively. No image of a square appears because it was determined that there no detectable edges 1233 for the square in the third frame 1230 of FIG. 12.

Moving to a second frame 1370 representing a next closer focus position, images of the circle 1374 and the square 1372 appear. The circle 1374 is shown because, according to the edge classification table 1208 of FIG. 12, edges of the circle have transitioned from being classified as soft edges 1235 in the third view 1230 to being classified as hard edges 1225 in the second view 1220. The square 1372 appears because the square is first classified as having edges 1223 in the second view 1220. No image of the triangle appears in the second view 1220 because the edges of the triangle transition from being classified as hard edges 1237 to soft edges 1227. As previously described, as an object's edges transition from hard edges to soft, the object is considered to be moving out of focus and can be removed from view.

In the first frame 1360, only the square 1362 appears. As indicated by the edge classification table 1208 of FIG. 12, the edges of the square transition from being classified as soft edges 1223 to being classified as hard edges 1213, indicating the square 1212 is coming into sharper focus at the focus distance of the first view 1210. On the other hand, the image of the circle does not appear in the first frame 1360 because, in the edge classification table 1208 of FIG. 12, the circle was classified as transitioning from presenting hard edges 1225 in the second frame 1220 to presenting soft edges 1215 in the first frame 1210.

In presenting the views 1380, 1370, and 1360 to a viewer, as the viewer "flies out of" the scene 600 of FIG. 6, the viewer will be presented with views including objects when they appear sufficiently in focus for their edges to be detected or when their edges become sharper and are classified as hard edges. As the viewer is presented with successive views moving toward a nearest or foreground focus position 1352, objects whose edge classifications suggest they are moving out of focus and, thus, further from the viewer, are removed from the view. Thus, the viewer is initially presented with a view of objects that are in focus or at least that have discernible edges at a distant focus position. Then, as the flythrough progresses, objects moving out of focus are removed from view and objects coming into focus or sharper focus are presented, just as if the viewer were flying backward through the scene as represented by the selectively inclusive views.

In addition to using this process to enable a flythrough view, the same process can be used to enable selective capture of foreground or background images, as well as images of objects at intermediate distances. For example, if a user of a mobile telephone wished to make a video telephony call, but did not want to include any of the background for the sake of privacy or preference, points on objects that only come into focus in more distant image sets can be suppressed. Alternatively, if one wanted to capture a vista of a landscape without capturing any foreground objects, any points in focus in near image sets could be suppressed.

Figure 14:
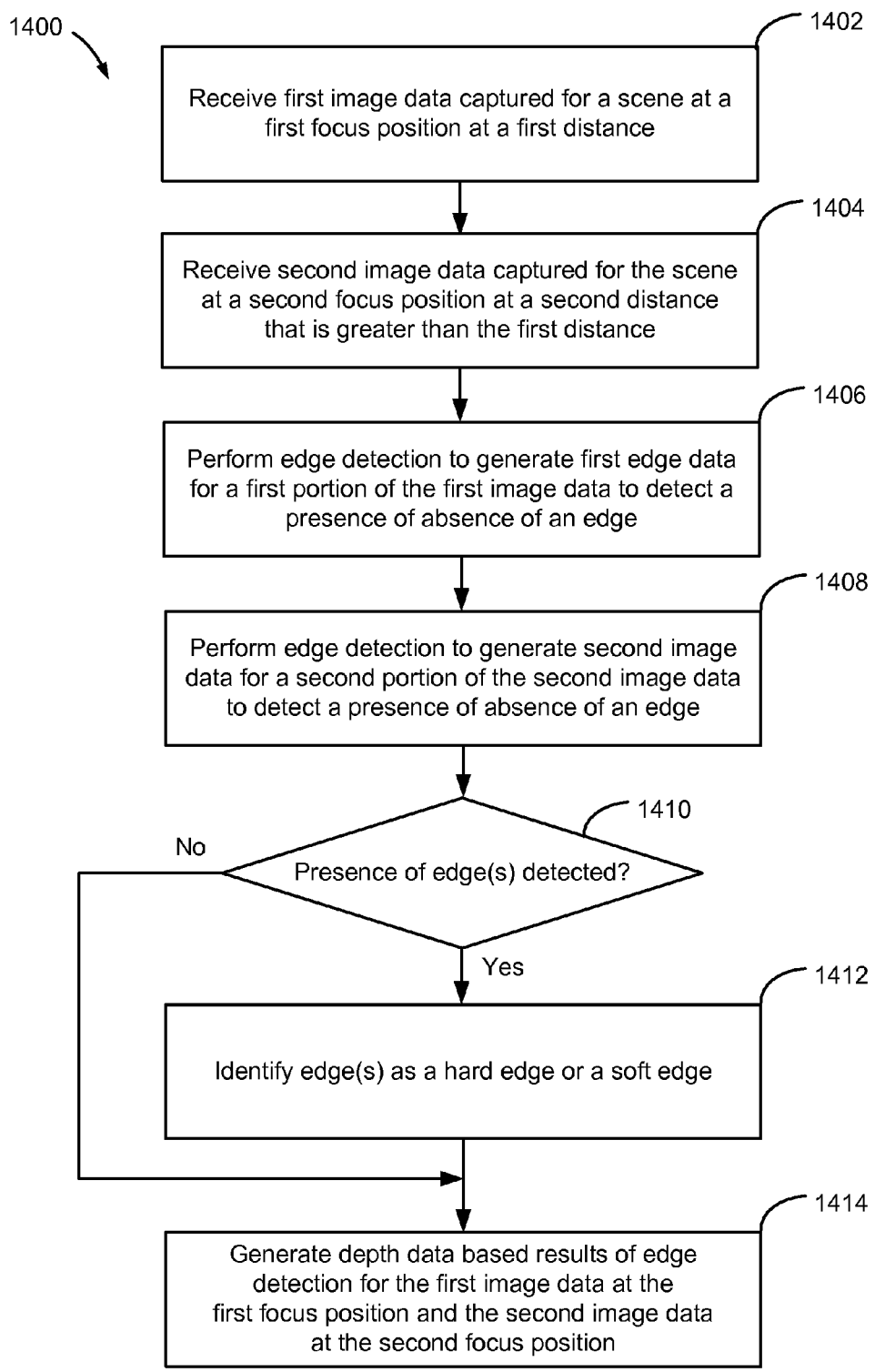
FIG. 14 is a flow chart of a particular illustrative embodiment of a process of using edge detection to generate depth data.

FIG. 14 is a flow chart 1400 of a process for receiving and processing image data using edge detection according to an embodiment of the present disclosure. At 1402, first image data that was captured for a scene captured at a first focus position corresponding to a first distance is received. For example, the first distance may represent a closest focus distance of an image capture device, such as a macro focus distance. At 1404, second image data that was captured for a scene captured at a second focus position corresponding to a second distance is received. The second distance is greater than the first distance. The second distance may include a far focus of the image capture device, such as optical infinity, or some other distance beyond the closest focus distance of the image capture device.

At 1406, an edge detection process is performed to generate first edge data for a first portion of the first image data to detect presence or absence of an edge. At 1408, the edge detection process is performed to generate edge data for points corresponding to a second portion of the second image data. At 1410, it is determined whether presence or absence of an edge has been detected. If an edge has been detected, at 1412, the edge is identified as a hard edge or a soft edge and then the process advances to 1414. On the other hand, if it is determined that no edge was detected, the process advances to 1414. At 1414, depth data is generated based on the presence or absence of an edge and each edge is identified as a hard edge or a soft edge. The depth data is generated for the first image data and the second image data. The depth data generated may include a depth map, as described with reference to FIG. 11, or any other manifestation of the depth data that may, for example, enable the selective presentation of foreground portions, background portions, or other aspects of the image data to permit suppression of parts of the image data, to support a flythrough mode, or to support other applications.

Figure 15:
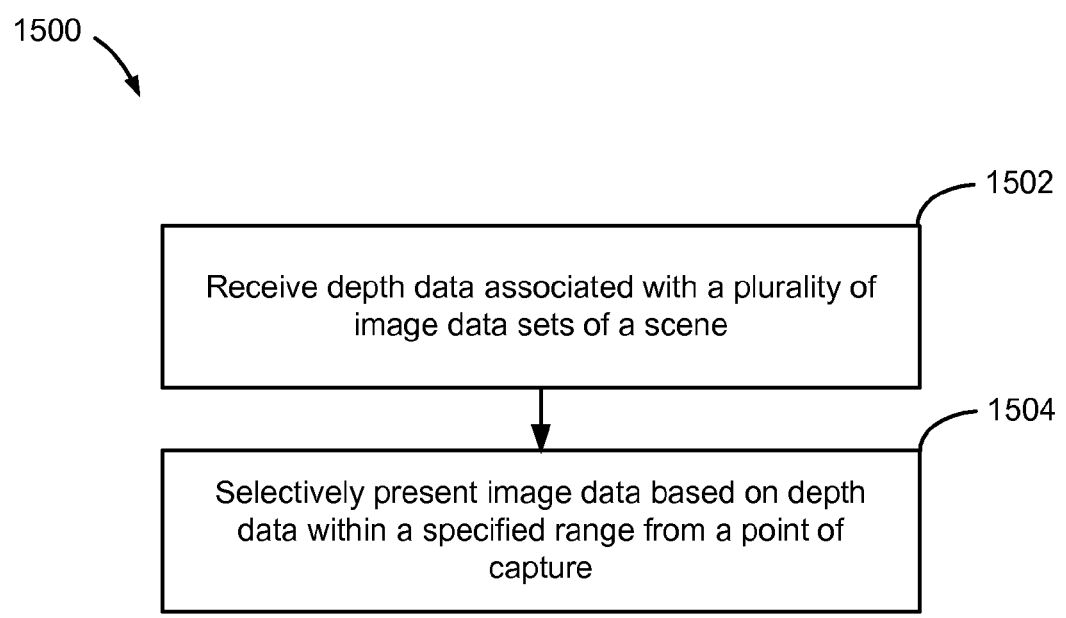
FIG. 15 is a flow chart of a particular illustrative embodiment of using a series of image data sets and edge detection to selectively present image data based on depth data.

FIG. 15 is a flow chart 1500 of a process for selectively presenting image data using depth data associated with a plurality of image data sets of a scene. At 1502, depth data associated with a plurality of image data sets of the scene is received. At 1504, image data from the image data sets is selectively presented based on depth data identifying portions of the image data within a specified range from a point of capture. As a result, for example, image data determined to be in a foreground of a scene may be enhanced, image data determined to be in a background of the image may be suppressed, or a combination thereof. Similarly, image data determined to be in a foreground, background, or other portion of the scene can be sequentially or selectively displayed in a fly through mode to enable the user to view the scene at varying positions away from the point of capture.

Figure 16:
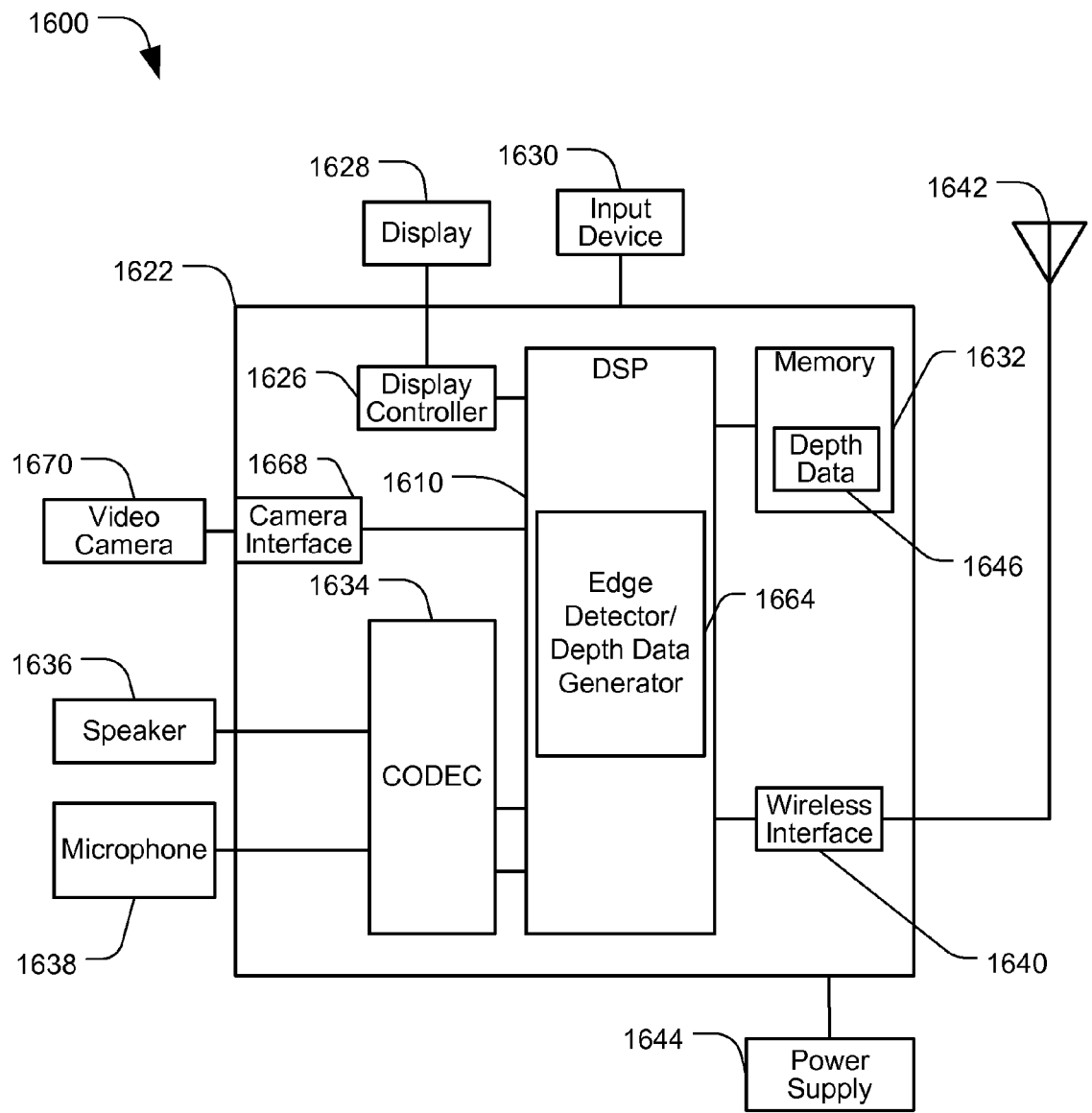
FIG. 16 is a block diagram of particular illustrative embodiment of a system including an edge detector/depth data generator.

FIG. 16 is a block diagram of particular embodiment of a system 1600 including an edge detector and depth data generator 1664. The system 1600 may be implemented in a portable electronic device and includes a signal processor 1610, such as a digital signal processor (DSP), coupled to a memory 1632. The edge detector and depth data generator 1664 is included in the signal processor 1610. In an illustrative example, the edge detector and depth data generator 1664 operates as described in accordance with FIGS. 1-13 and in accordance with the process of FIGS. 14 and 15, or any combination thereof.

A camera interface 1668 is coupled to the signal processor 1610 and also coupled to a camera, such as a video camera 1670. The camera interface 1668 may be adapted to take multiple images of a scene in response to a single image capture command, such as a from a user "clicking" a shutter control or other image capture input, either automatically or in response to a signal generated by the DSP 1610. A display controller 1626 is coupled to the signal processor 1610 and to a display device 1628. A coder/decoder (CODEC) 1634 can also be coupled to the signal processor 1610. A speaker 1636 and a microphone 1638 can be coupled to the CODEC 1634. A wireless interface 1640 can be coupled to the signal processor 1610 and to a wireless antenna 1642.

The signal processor 1610 is adapted to detect edges in image data based on changes in intensity values between neighboring data points as previously described. The signal processor 1610 is also adapted to generate depth data 1646, such as a depth map or other form of depth data, derived with image data sets as previously described. The image data may include video data from the video camera 1670, image data from a wireless transmission via the antenna 1642, or from other sources such as an external device coupled via a universal serial bus (USB) interface (not shown), as illustrative, non-limiting examples.

The display controller 1626 is configured to receive the processed image data and to provide the processed image data to the display device 1628. In addition, the memory 1632 may be configured to receive and to store the processed image data, and the wireless interface 1640 may be configured to receive the processed image data for transmission via the antenna 1642.

In a particular embodiment, the signal processor 1610, the display controller 1626, the memory 1632, the CODEC 1634, the wireless interface 1640, and the camera interface 1668 are included in a system-in-package or system-on-chip device 1622. In a particular embodiment, an input device 1630 and a power supply 1644 are coupled to the system-on-chip device 1622. Moreover, in a particular embodiment, as illustrated in FIG. 16, the display device 1628, the input device 1630, the speaker 1636, the microphone 1638, the wireless antenna 1642, the video camera 1670, and the power supply 1644 are external to the system-on-chip device 1622. However, each of the display device 1628, the input device 1630, the speaker 1636, the microphone 1638, the wireless antenna 1642, the video camera 1670, and the power supply 1644 can be coupled to a component of the system-on-chip device 1622, such as an interface or a controller.

Figure 17:
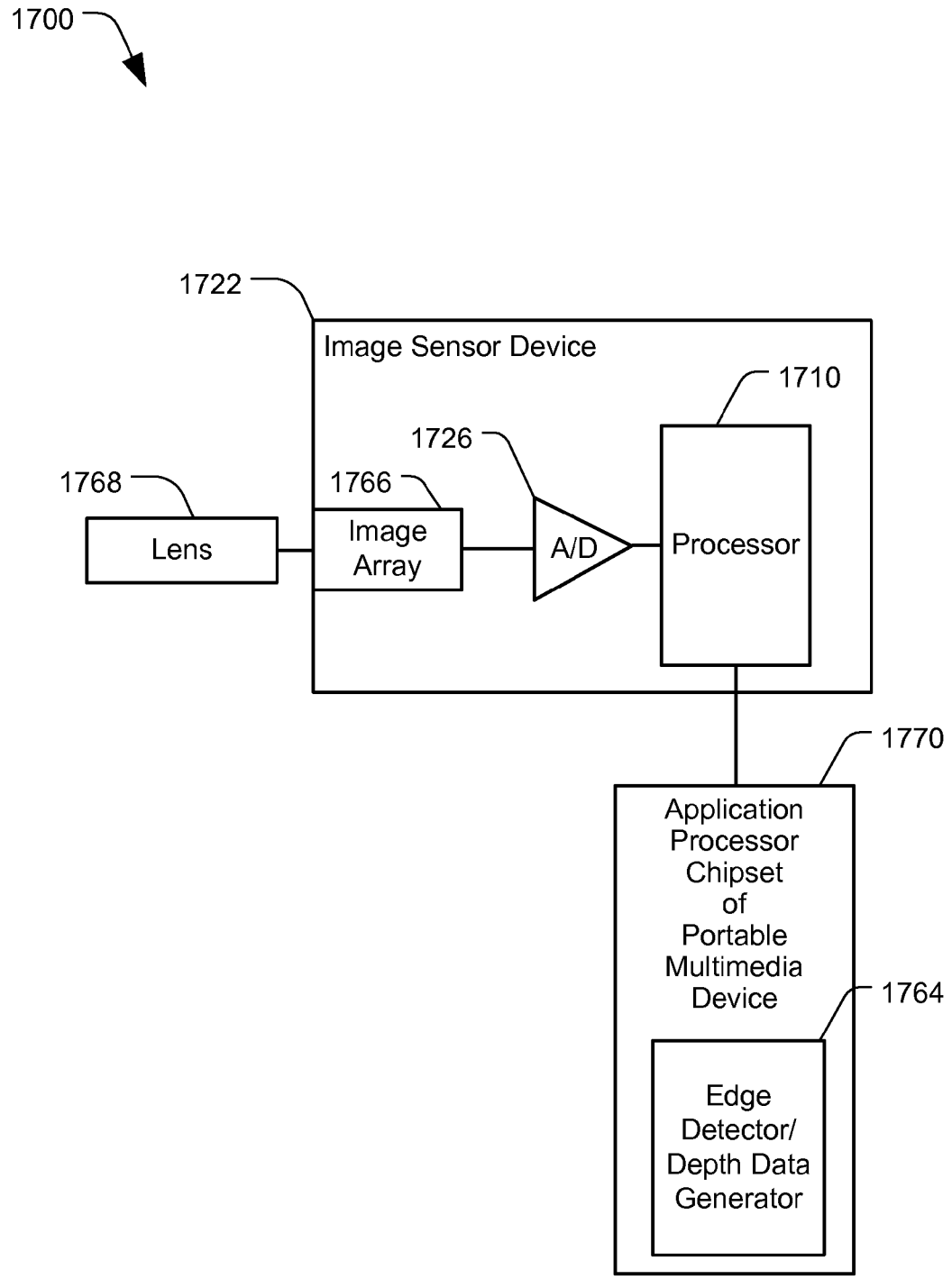
FIG. 17 is a block diagram of particular illustrative embodiment of a system including an edge detector/depth data generator.

FIG. 17 is a block diagram of particular embodiment of a system 1700 including an edge detector and depth data generator 1764. The system 1700 includes an image sensor device 1722 that is coupled to a lens 1768 and also coupled to an application processor chipset of a portable multimedia device 1770. In one embodiment, the image sensor device 1722 receives an input signal from the application processor chipset 1770 to capture multiple sets of image data at varying focus distances for each scene captured using the system 1700. The edge detector and depth data generator 1764 included in the application processor chipset 1770 receives the multiple sets of image data and performs edge detection and depth data generation as previously described. Alternatively, the edge detector and depth data generator 1764 could be incorporated within a processor 1710 that may be included in the image sensor device 1722 or disposed separately in the image sensor device 1722 such that, when a command to capture image data is received by the image sensor device, the capture of multiple sets of image data and edge detection/ depth data generation may be performed in the image sensor device 1722. Further alternatively, the edge detector and depth data generator 1764 may otherwise incorporated within the system 1700 in communication with the application processor chipset 1770, the image sensor device 1722, or a combination thereof.

The application processor chipset 1770 and the edge detector and depth data generator 1764 receive image data from the image sensor device 1722. The image sensor device 1722 captures the image data by receiving a visual image from the lens 1768 and receiving data in an image array 1766. The data received in the image array 1766 is processed to create digital image data by passing the data received, for example, through an analog-to-digital convertor 1726 that is coupled to receive an output of the image array 1766. If included, the processor 1710 of the image sensor device 1722 further processes the image data, for example, to correct for bad clusters, non-optimal color or lighting conditions, or other factors. The resulting image data is received by the edge detector and depth data generator 1764 to generate depth data, such as a depth map, from the image data captured by the system 1700.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
receiving, with a hardware processor, first image data corresponding to a scene recorded by an image capture device at a first focus position associated with a first distance from the image capture device;
receiving, with a hardware processor, second image data corresponding to the scene at a second focus position associated with a second distance from the image capture device, wherein the second distance is greater than the first distance;
performing, with a hardware processor, an edge detection process to generate first edge data corresponding to at least a first portion of the first image data and to generate second edge data corresponding to at least a second portion of the second image data, wherein the edge detection process detects a presence and an absence of an edge at each location of the first portion of the first image data and the second portion of the second image data and each detected edge is identified as a hard edge or a soft edge; and
generating, with a hardware processor, depth data based on the first edge data and the second edge data.

2. The method of claim 1, wherein the first image data includes a sharper focus of a nearer object than for a more distant object, and the second image data includes a sharper focus for the more distant object than for the nearer object.

3. The method of claim 1, wherein the first image data and the second image data include a plurality of intensity values.

4. The method of claim 3, wherein a gradual intensity change across a range of points around a selected point of the first or second image data indicates a soft edge condition and a sharp intensity change across the range of points indicates a hard edge condition.

5. The method of claim 4, wherein the depth data identifies at least one location in the second image data where a hard edge condition is present that was not present in the first edge data and the depth data associates the second focus position with the location in the second image data.

6. The method of claim 5, wherein the depth data includes a depth map.

7. The method of claim 1, wherein the first focus position includes a macro focus distance.

8. The method of claim 7, wherein the second focus position includes an infinity focus distance.

9. The method of claim 8, further comprising at least one additional set of image data captured at an intermediate focus distance between the macro focus distance and the infinity focus distance.

10. An imaging system, comprising:
an input to receive a control signal to capture image data;
an image capture device to generate a plurality of image data sets captured at a plurality of focus positions in response to the control signal; and
an output to provide an output image and to provide depth data for at least one point in the output image based on a focus position in which the at least one point is determined to have a detectable edge in the output image; and
an edge detector configured to determine whether a selected point in the output image indicates presence of the detectable edge based on changes in intensity values, wherein the detectable edge includes one of a hard edge and a soft edge.

11. The system of claim 10, wherein the control signal is configured to cause the image capture device to generate image data sets at a plurality of focus positions including a macro focus position and an infinity focus position.

12. The system of claim 10, wherein the image capture device includes a charge-coupled device (CCD) image capture device.

13. An image processing apparatus, comprising:
means for receiving first image data corresponding to a scene recorded by an image capture device at a first focus position associated with a first distance from the image capture device;
means for receiving second image data corresponding to the scene at a second focus position associated with a second distance from the image capture device, wherein the second distance is greater than the first distance;
means for performing an edge detection process to generate first edge data corresponding to at least a first portion of the first image data and to generate second edge data corresponding to at least a second portion of the second image data, wherein the edge detection process detects a presence and an absence of an edge at each location of the first portion of the first image data and the second portion of the second image data and each detected edge is identified as a hard edge or a soft edge; and
means for generating depth data based on the first edge data and the second edge data.

14. The apparatus of claim 13, wherein the means for receiving first image data is an image data input module.

15. The apparatus of claim 13, wherein the means for performing an edge detection process is an edge detection and depth data generation module.

16. The apparatus of claim 13, wherein the means for generating depth data is an edge detection and depth data generation module.

17. The apparatus of claim 13, wherein the first focus position includes a macro focus distance.

18. The apparatus of claim 17, wherein the second focus position includes an infinity focus distance.

19. The apparatus of claim 17, further comprising at least one additional set of image data captured at an intermediate focus distance between the macro focus distance and the infinity focus distance.

20. A non-transitory, computer readable storage medium having instructions stored thereon that when executed by a processor performs a method comprising:
receiving first image data corresponding to a scene recorded by an image capture device at a first focus position associated with a first distance from the image capture device;
receiving second image data corresponding to the scene at a second focus position associated with a second distance from the image capture device, wherein the second distance is greater than the first distance;
performing an edge detection process to generate first edge data corresponding to at least a first portion of the first image data and to generate second edge data corresponding to at least a second portion of the second image data, wherein the edge detection process detects a presence and an absence of an edge at each location of the first portion of the first image data and the second portion of the second image data and each detected edge is identified as a hard edge or a soft edge; and
generating depth data based on the first edge data and the second edge data.

21. The non-transitory computer readable storage medium of claim 20, wherein the instructions execute a method, wherein the first image data includes a sharper focus of a nearer object than for a more distant object, and the second image data includes a sharper focus for the more distant object than for the nearer object.

22. The non-transitory computer readable storage medium of claim 20, wherein the instructions execute a method, wherein the first image data and the second image data include a plurality of intensity values.

23. The non-transitory computer readable storage medium of claim 20, wherein the instructions execute a method, wherein the a gradual intensity change across a range of points around a selected point of the first or second image data indicates a soft edge condition and a sharp intensity change across the range of points indicates a hard edge condition.

24. The non-transitory computer readable storage medium of claim 20, wherein the instructions execute a method, wherein the depth data identifies at least one location in the second image data where a hard edge condition is present that was not present in the first edge data and the depth data associates the second focus position with the location in the second image data.

25. The non-transitory computer readable storage medium of claim 20, wherein the instructions execute a method, wherein the depth data includes a depth map.

* * * * *